US010133619B1

(12) United States Patent
Nagpal et al.

(10) Patent No.: US 10,133,619 B1
(45) Date of Patent: Nov. 20, 2018

(54) CLUSTER-WIDE VIRTUAL MACHINE HEALTH MONITORING

(71) Applicant: Nutanix, Inc., San Jose, CA (US)

(72) Inventors: Abhinay Nagpal, San Jose, CA (US); Alexander J. Kaufmann, San Jose, CA (US); Himanshu Shukla, San Jose, CA (US); Jason Sims, Redwood City, CA (US); Varun Kumar Arora, Mountain View, CA (US); Venkata Vamsi Krishna Kothuri, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 157 days.

(21) Appl. No.: 15/174,977

(22) Filed: Jun. 6, 2016

Related U.S. Application Data

(60) Provisional application No. 62/172,738, filed on Jun. 8, 2015.

(51) Int. Cl.
*G06F 11/00* (2006.01)
*G06F 11/07* (2006.01)
*G06F 9/455* (2018.01)

(52) U.S. Cl.
CPC ........ *G06F 11/079* (2013.01); *G06F 9/45558* (2013.01); *G06F 11/0709* (2013.01); *G06F 11/0712* (2013.01); *G06F 11/0751* (2013.01); *G06F 11/0787* (2013.01); *G06F 2009/45575* (2013.01)

(58) Field of Classification Search
CPC ............... G06F 11/079; G06F 11/0709; G06F 11/0712; G06F 11/0751; G06F 11/0787; G06F 11/0793; G06F 11/3003; G06F 11/3006; G06F 11/301; G06F 11/3055; G06F 9/45558; G06F 2009/45575
See application file for complete search history.

(56) References Cited

U.S. PATENT DOCUMENTS

| | | | | |
|---|---|---|---|---|
| 7,770,059 | B1 * | 8/2010 | Glade | G06F 11/0712 709/213 |
| 8,549,518 | B1 * | 10/2013 | Aron | G06F 9/45558 718/1 |
| 8,601,473 | B1 | 12/2013 | Aron et al. | |
| 8,850,130 | B1 | 9/2014 | Aron et al. | |
| 8,997,097 | B1 | 3/2015 | Aron et al. | |
| 9,052,936 | B1 | 6/2015 | Aron et al. | |
| 9,256,374 | B1 | 2/2016 | Aron et al. | |
| 9,256,475 | B1 | 2/2016 | Aron et al. | |

(Continued)

OTHER PUBLICATIONS

U.S. Appl. No. 15/006,416, filed Jan. 26, 2016, 64 pages.

(Continued)

*Primary Examiner* — Joseph D Manoskey
(74) *Attorney, Agent, or Firm* — Vista IP Law Group, LLP

(57) ABSTRACT

Systems for self-configuring health monitoring instrumentation for clustered storage platforms. Master and slave health modules implement a health monitoring system in a clustered virtualization environment comprising a plurality of nodes of the cluster with an installed health module instance running on the nodes. The health module system may gather and analyze data on a node level and at a cluster level to manage the cluster. The cluster health module system observes I/O commands issued to, and I/O command responses returned from, a common storage pool. Health data is stored in the storage pool.

20 Claims, 26 Drawing Sheets

(56) References Cited

U.S. PATENT DOCUMENTS

| | | |
|---|---|---|
| 9,354,912 B1 | 5/2016 | Aron et al. |
| 9,389,887 B1 | 7/2016 | Aron et al. |
| 9,575,784 B1 | 2/2017 | Aron et al. |
| 9,619,257 B1 | 4/2017 | Aron et al. |
| 2009/0228589 A1 | 9/2009 | Korupolu |
| 2010/0242032 A1* | 9/2010 | Ladki ..................... G06F 8/71 717/171 |
| 2016/0085582 A1 | 3/2016 | Farkas et al. |
| 2016/0164963 A1 | 6/2016 | Ganguli et al. |
| 2016/0218951 A1 | 7/2016 | Vasseur et al. |
| 2016/0352866 A1 | 12/2016 | Gupta et al. |
| 2017/0293537 A1* | 10/2017 | Sun ..................... G06F 11/203 |

OTHER PUBLICATIONS

U.S. Appl. No. 15/006,435, filed Jan. 26, 2016, 65 pages.
Non-Final Office Action dated Apr. 5, 2018 for related U.S. Appl. No. 15/186,400.
Wikipedia. "DBSCAN". Feb. 18, 2014. 4 pages.

\* cited by examiner

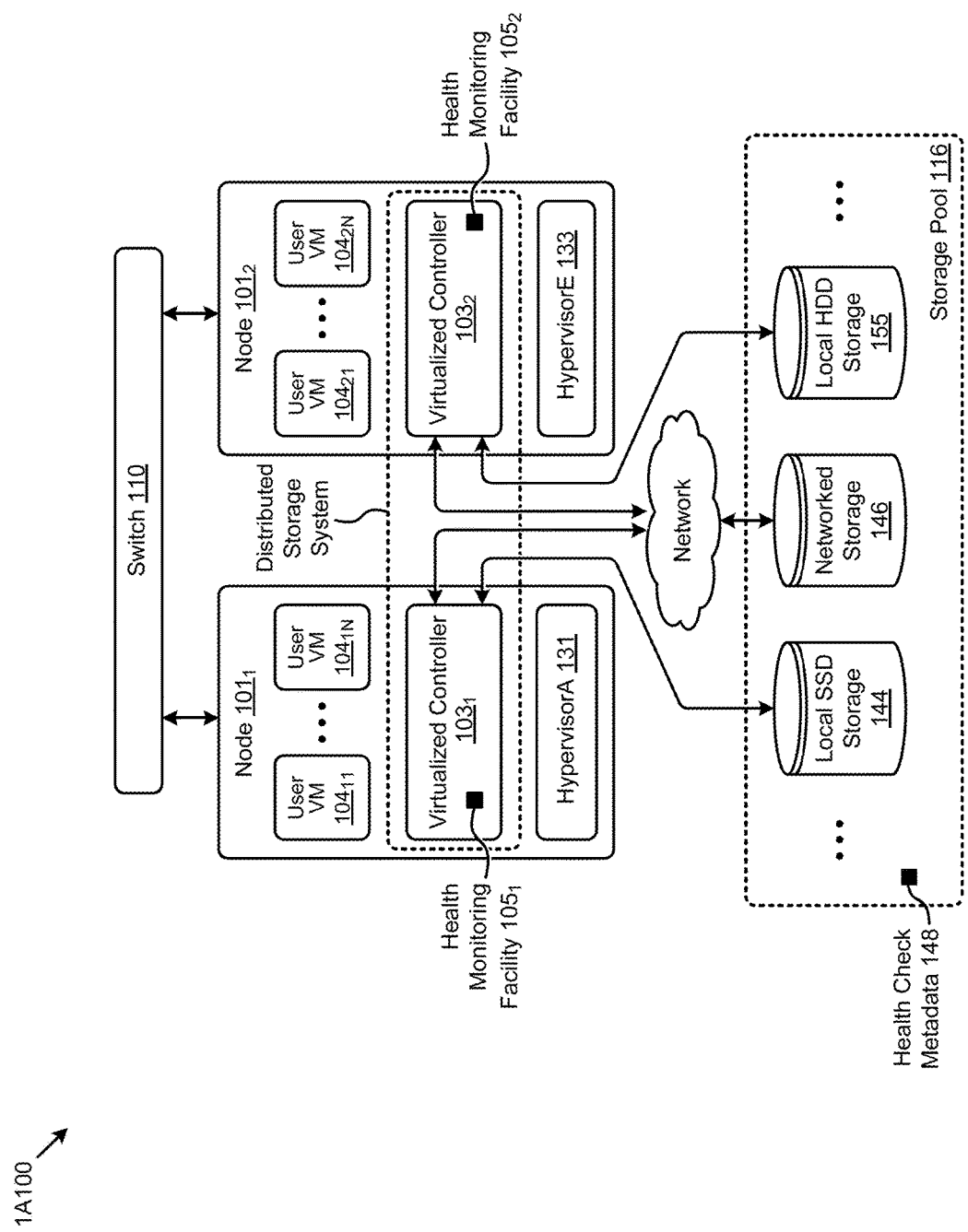
FIG. 1A1

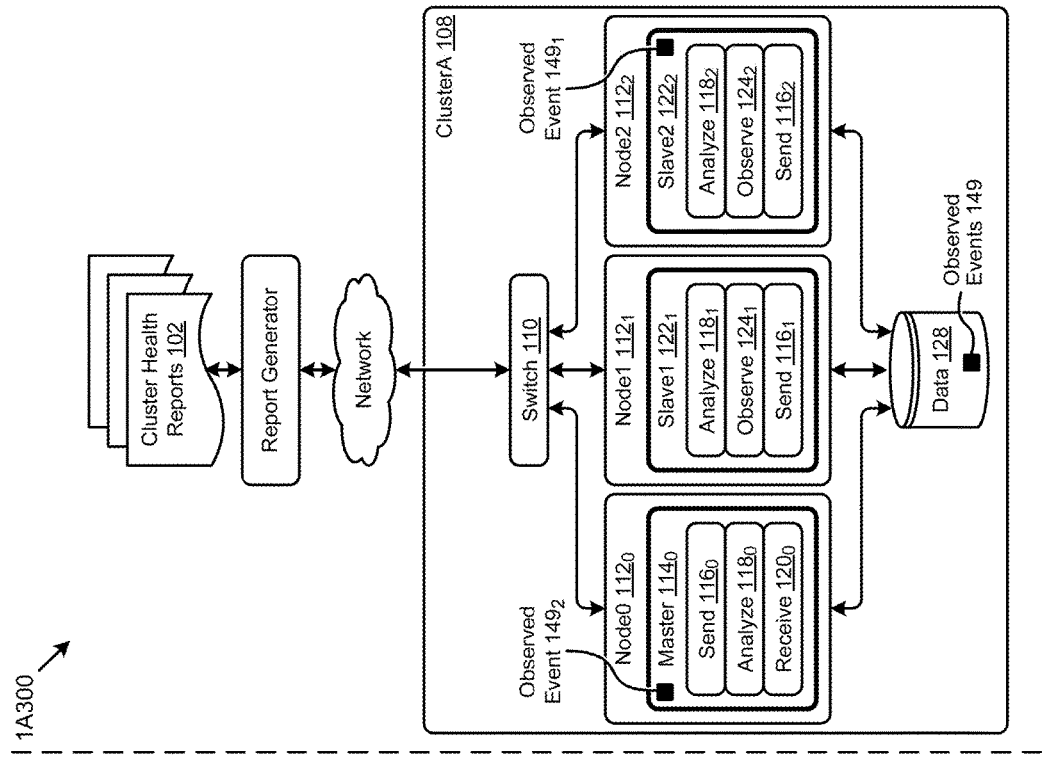
FIG. 1A3
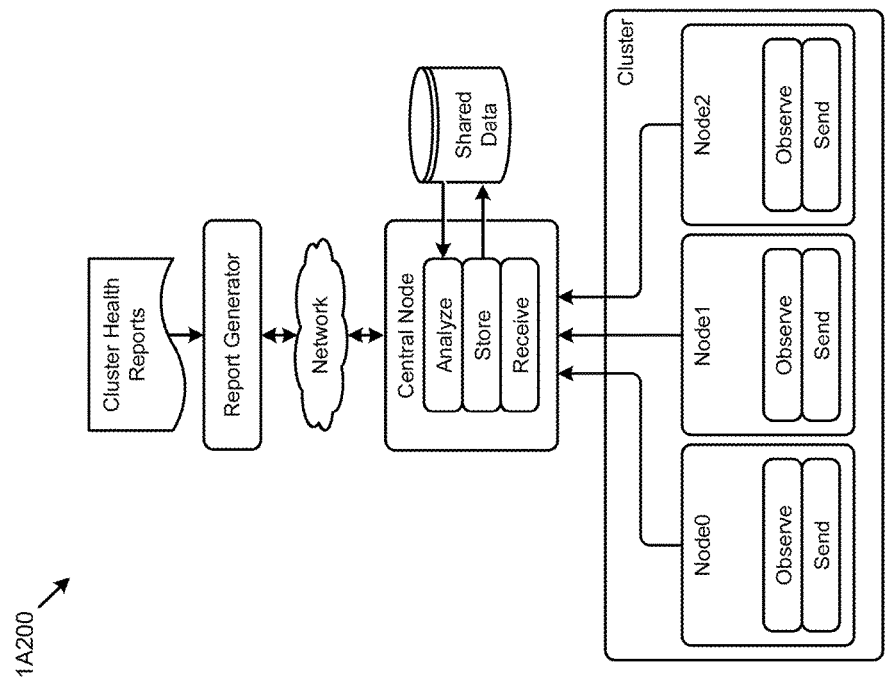
FIG. 1A2

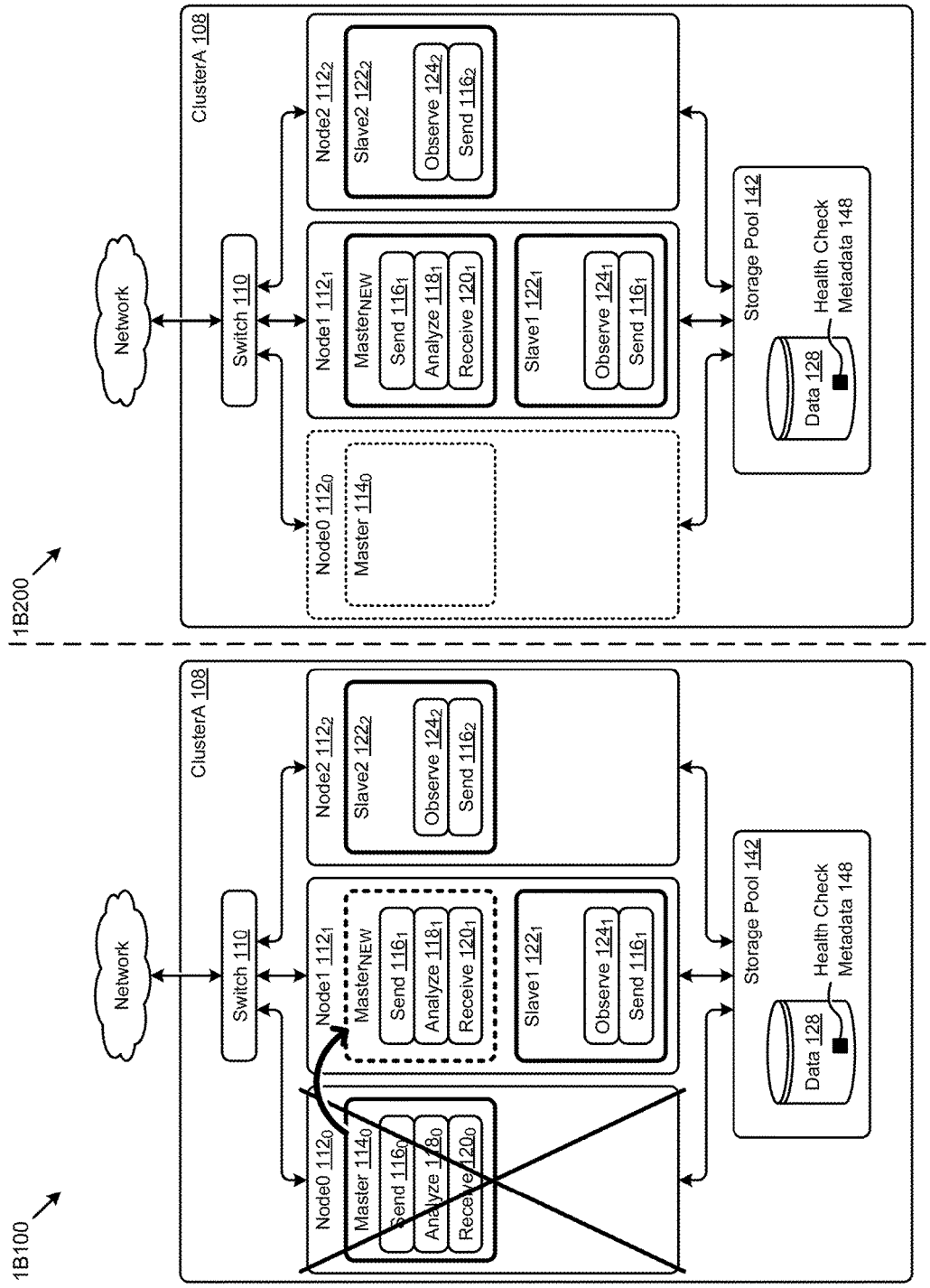

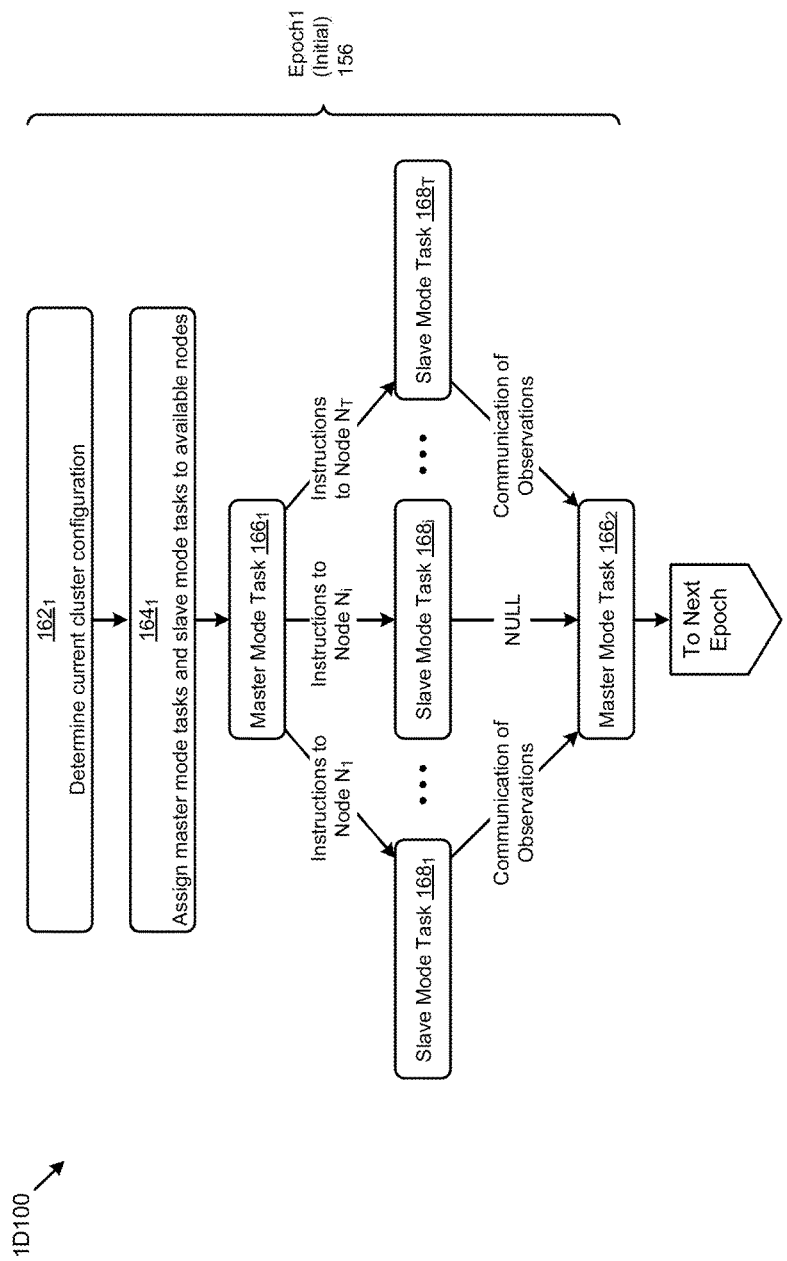
FIG. 1D1

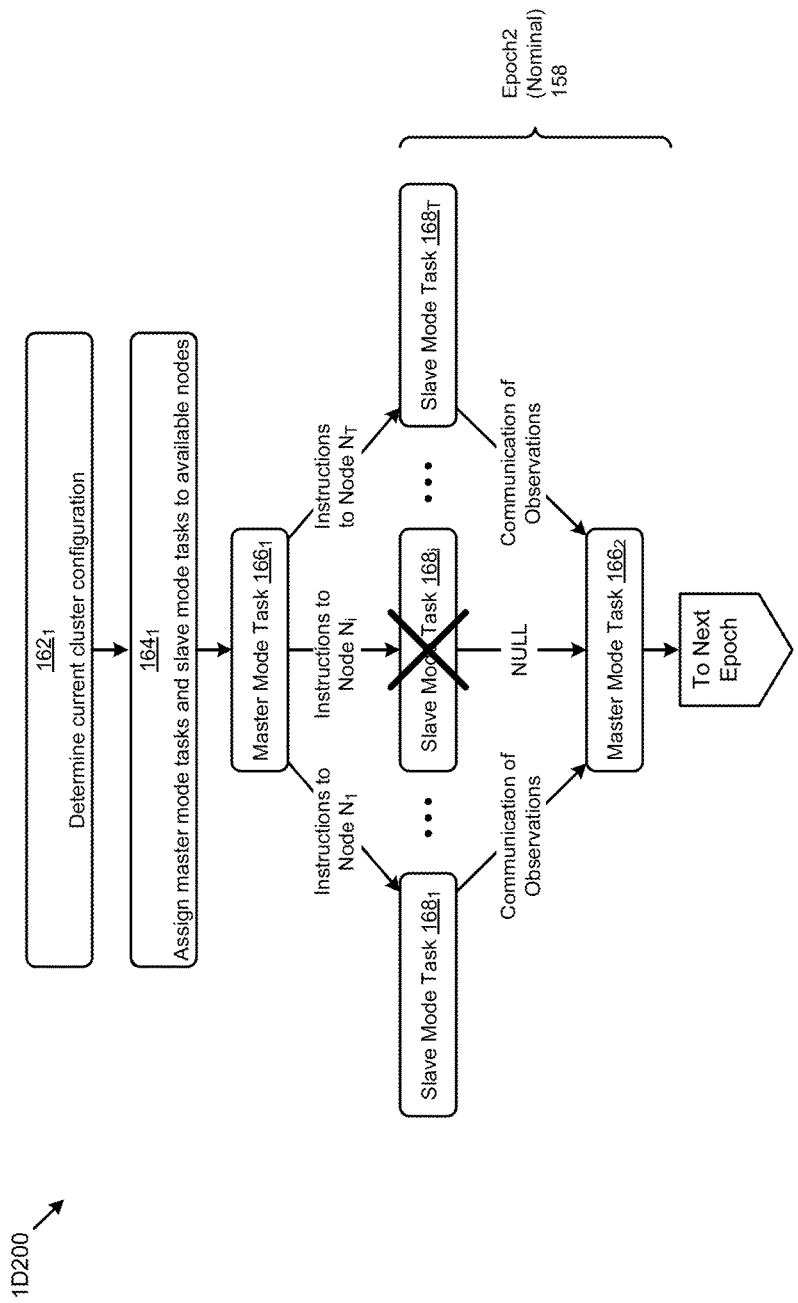
FIG. 1D2

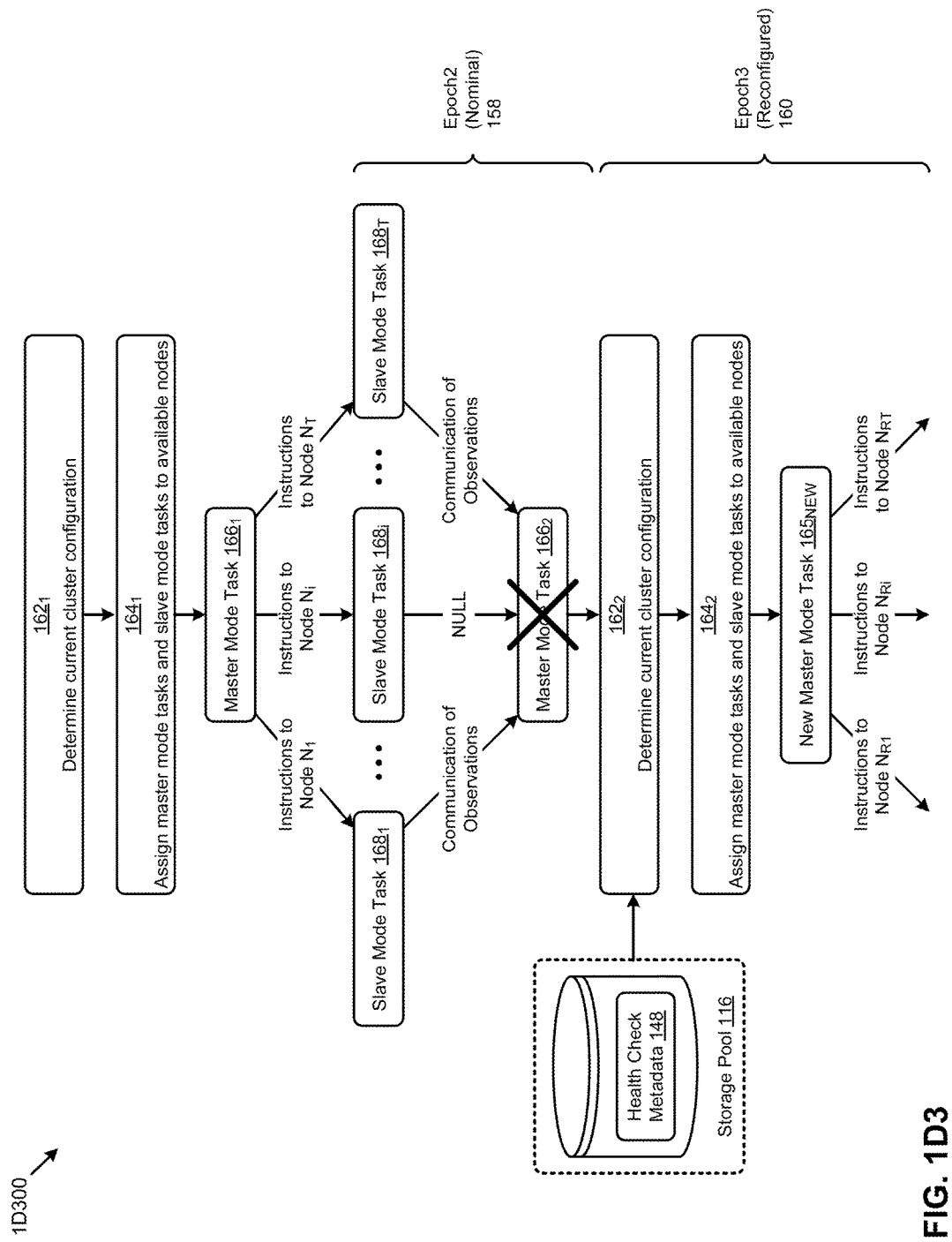
FIG. 1D3

CLUSTER-WIDE VIRTUAL MACHINE HEALTH MONITORING

RELATED APPLICATIONS

The present application claims the benefit of priority to U.S. Patent Application Ser. No. 62/172,738 titled, "HEALTH MODULE SYSTEM", filed Jun. 8, 2015, which is hereby incorporated by reference in its entirety.

FIELD

This disclosure relates to self-configuring instrumentation and health reporting systems for clustered storage platforms, and more particularly to techniques for cluster-wide health monitoring using a virtualized storage controller.

BACKGROUND

Groups of processors are sometimes organized in accordance with a topology such as a spoke-and-wheel topology, or a star or mesh topology, or as an M-by-N array. Groups of processors might be interconnected by a backplane or network of some sort such that any single processor node can communicate with at least some other processor node in the group. In some cases, groups of interconnected processors are logically and/or physically organized into a "cluster", and the processors within the group of processors share a common storage facility.

For many reasons, the deployer of a cluster (e.g., a site manager, an IT manager, a CIO, a vendor, etc.) would want to assess the "health" of a cluster at any moment in time. Based on the health (or observed degradation thereto) of the cluster, remedial action might be taken by the deployer of a cluster. Cluster-wide health monitors often operate by installing an agent onto each processing node, collecting observations over time, retrieving (e.g., by a central node) the observations taken at the processor nodes, and assembling health reports (e.g., by a central node) based on the retrieved observations.

Unfortunately, legacy monitoring fails to make observations or otherwise take into account the health of a processor or group of processors within a group of processors that share a common storage facility. Situations such as one node blocking another node when both nodes access the same common storage facility go undetected and unreported.

Moreover, legacy techniques fail to achieve the necessary degree of resilience in the system so as to provide health reports in the face of faults or other events (e.g., interruption of service, or temporary or permanent node failure). For example, if the aforementioned central node goes down, then the entire facility to provide health reports also goes down.

The advent and rapid adoption of virtualization using virtual machines (VMs) and/or virtualizing executable containers (e.g., Docker containers) brings to the fore many new possibilities for a health monitoring system to advance to a much greater degree of observation and reporting. At the same time, the rapid adoption and uses of virtualization techniques brings to bear an explosion of observations. Strictly as an example, if a cluster has 1024 nodes, legacy techniques would collect observations at 1024 nodes. However in an environment where each processor hosts several, or dozens, or scores or more virtual machines, and in situations where there are inter-processor communications or effects that are being observed, the number of collected observations grows super-linearly. New highly resilient techniques are needed to deal with inter-processor communications and/or inter-VM communications.

A "virtual machine" or a "VM" refers to a specific software-based implementation of a machine in a virtualization environment in which the hardware resources of a real computer (e.g., CPU, memory, etc.) are virtualized or transformed into virtualized resources that support fully functional virtual machines that can be configured to run its own operating system. Using virtualized resources, an instance of a virtual machine can include all or some components of an operating system as well as any applications, browsers, plug-ins, etc., any of which can use the underlying physical resources just like a real computer.

Virtual machines work by inserting a thin layer of software directly onto the computer hardware or onto a host operating system. This layer of software contains a virtual machine monitor or "hypervisor" that allocates hardware resources dynamically and transparently. Multiple operating systems can run concurrently on a single physical computer and share hardware resources with each other. By encapsulating an entire machine, including CPU, memory, operating system, and network devices, a virtual machine is completely compatible with most standard operating systems, applications, and device drivers. Many modern implementations support concurrent running of several operating systems and/or containers and/or applications on a single computer, with each of the several operating systems and/or containers and/or applications having access to the resources it needs when it needs them.

Virtualization allows a deployer to run multiple virtualizing entities on a single physical machine, with each virtualizing entity sharing the resources of that one physical computer across multiple environments. Different virtualizing entities can run different operating systems and multiple applications on the same physical computer.

Such virtualization makes it easier to manage large set of processing nodes (e.g., arrays) that may be delivered with multiple processors on a board, or in a blade, or in a unit, or rack or chassis, etc. The health of such a set of processors as well as their respective peripherals has been attempted by using health-monitoring agents that take measurements and/or make observations at each node.

Unfortunately, rather than taking advantage of the flexibilities offered by virtualization, legacy techniques rely on centralized services provided at a central node. Such a central node can fail due to certain events (or be taken out of service due to certain events), which events can result in missed observations over the set of nodes. Missed observations in turn can precipitate a domino effect whereby early warnings and/or alerts might be missed, resulting in a lack of or late remediation, further resulting in degradation of performance or, in some cases, a complete loss of function of one or more nodes. Certain legacy deployments involving off-site centralized management facilities can fail due to failure of the off-site centralized management facility itself and/or failure in the communication fabric between the centralized management facility and nodes under management. Legacy deployments fail to provide any techniques for self-reconfiguration in the event of a failure of loss of utility of a computing component, whether they be hardware components or a software components. Moreover, legacy techniques fail to account for inter-node effects or other cluster-wide effects that emerge due to any of (1) aspects pertaining to inter-node I/O (input/output or IO), and (2) aspects pertaining to node-to-shared-storage I/O.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for cluster-wide virtual machine health monitoring, which techniques advance the relevant technologies to address technological issues with legacy approaches. More specifically, the present disclosure provides a detailed description of techniques used in systems, methods, and in computer program products for cluster-wide virtual machine health monitoring. Certain embodiments are directed to technological solutions to define and deploy self-reconfiguring cluster-wide instrumentation modules, which embodiments advance the relevant technical fields of cluster health monitoring, as well as advancing peripheral technical fields.

The disclosed embodiments modify and improve over legacy approaches. In particular, the herein-disclosed techniques provide technical solutions that address the technical problems attendant to provide uninterrupted monitoring over a clustered storage platform even when components of the clustered storage platform fail or are taken out of service. Such technical solutions serve to reduce the demand for computer memory, reduce the demand for computer processing power, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in various technical fields related to ongoing management of distributed storage systems.

Further details of aspects, objectives, and advantages of the technological embodiments are described herein and in the following descriptions, drawings, and claims.

BRIEF DESCRIPTION OF THE DRAWINGS

The drawings described below are for illustration purposes only. The drawings are not intended to limit the scope of the present disclosure.

FIG. 1A1 depicts a cluster 1A100 having a plurality of nodes that access a shared storage pool through respective node-specific virtualized storage controllers, according to some embodiments.

FIG. 1A2 exemplifies a cluster computing environment having a central node involved in cluster health monitoring.

FIG. 1A3 exemplifies a cluster computing environment having distributed master and slave components to implement cluster-wide virtual machine health monitoring, according to some embodiments.

FIG. 1B1 exemplifies a single observation node failure scenario that is remediated by having distributed master and slave components to implement cluster-wide virtual machine health monitoring, according to an embodiment.

FIG. 1B2 exemplifies a master component failure scenario that is remediated by retargeting a master component to implement fault-tolerant cluster-wide virtual machine health monitoring, according to some embodiments.

FIG. 1D1 depicts an initial configuration of redeployable virtual machines to implement cluster-wide virtual machine health monitoring, according to an embodiment.

FIG. 1D2 depicts a slave component fault scenario that is remediated using redeployable virtual machines to implement cluster-wide virtual machine health monitoring, according to an embodiment.

FIG. 1D3 depicts a master component fault scenario that is remediated using redeployable virtual machines to implement cluster-wide virtual machine health monitoring, according to an embodiment.

FIG. 2 depicts a virtualization environment that can be remediated using redeployable virtual machines to implement cluster-wide virtual machine health monitoring, according to an embodiment.

FIG. 3 illustrates a health module architecture as used to implement cluster-wide virtual machine health monitoring, according to an embodiment.

DETAILED DESCRIPTION

Figure 1C:
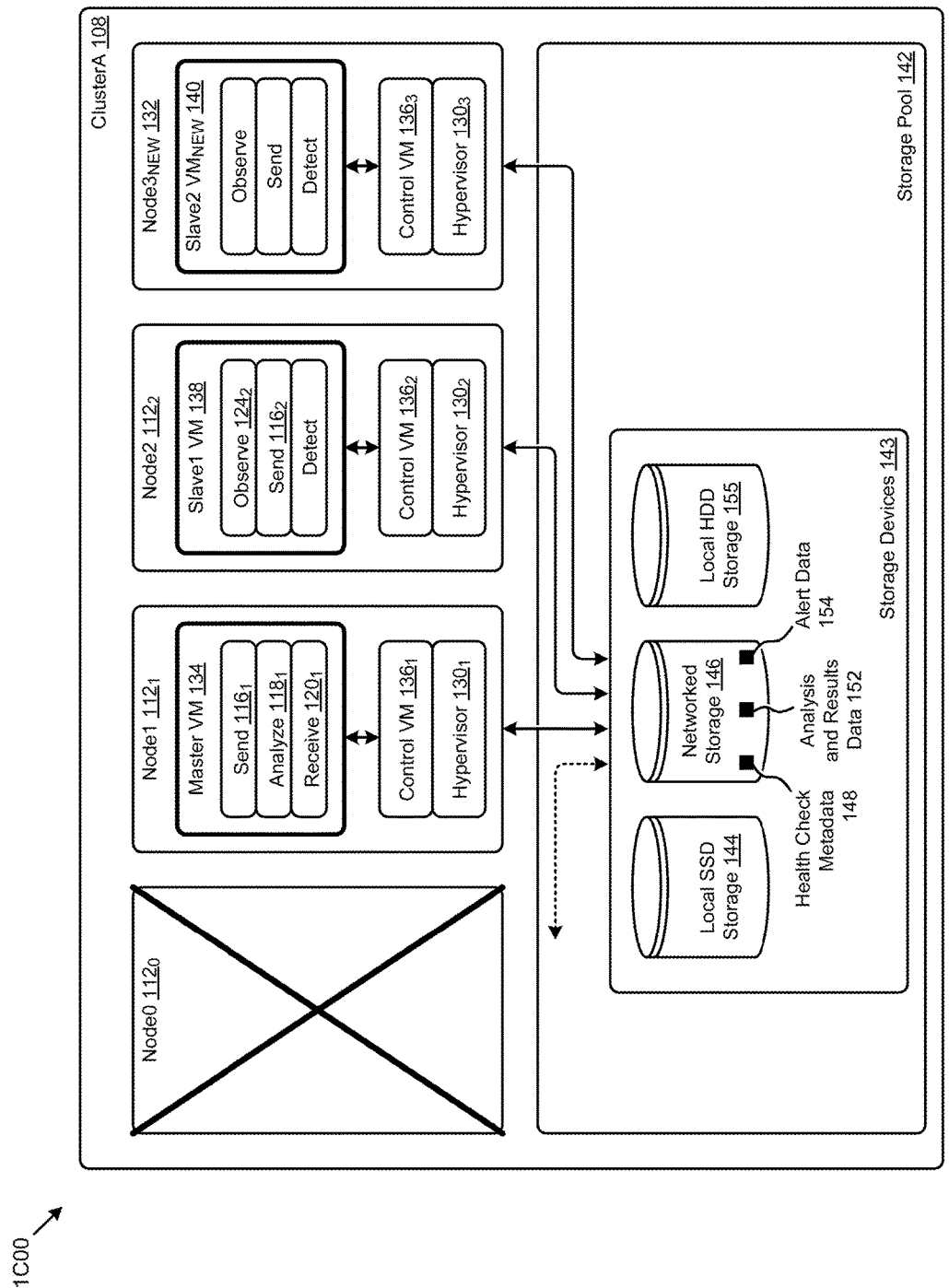
FIG. 1C exemplifies a hyperconverged cluster having redeployable virtual machines to implement change-tolerant reconfigurable cluster-wide virtual machine health monitoring, according to some embodiments.

Some embodiments of the present disclosure address the problems attendant to providing uninterrupted monitoring over a clustered storage platform even when components of the clustered storage platform fail or are taken out of service. Some embodiments are directed to approaches to define and deploy self-reconfiguring cluster-wide instrumentation modules. More particularly, disclosed herein and in the accompanying figures are exemplary environments, techniques, systems, methods, and computer program products to implement cluster-wide virtual machine health monitoring.

Overview

The present disclosure provides architectures for implementing a health module system in a virtualization environment. In one embodiment the health module system includes health module instances installed on the individual nodes. The health modules can be self-contained in an executable container, and/or can be installed within a control VM, thereby enabling the individual instances of the health module system to be hardware-, hypervisor-, and software-agnostic.

In another embodiment the health module instances comprise both master and slave modules for taking cluster level and node level observations. The health modules read from and write to the cluster's logical storage pool including health check metadata, analysis and results, and alert data. Cluster-wide health-related data is stored in the cluster's storage pool, which emulates inter-processor broadcast communications.

Some embodiments automatically administer cluster wide updates and installation of new versions of software. A management console includes a graphical user interface that aids an administrative user when changing the configuration of a group of nodes in a cluster. In some embodiments, planned or unplanned changes in the configuration are automatically detected and remediated.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A1 depicts a cluster 1A100 having a plurality of nodes that access a shared storage pool through respective node-specific virtualized storage controllers. As shown, a plurality of nodes (e.g., node $101_1$ and node $101_2$) access a shared storage facility (e.g., storage pool 116). The shown user virtual machines (e.g., user VM $104_{11}, \ldots,$ user $104_{1N}$, user VM $104_{21}, \ldots,$ user VM $104_{2N}$) rely on storage virtualization as provided by virtualized controller $103_1$ and virtualized controller $103_2$. In this and other examples as disclosed herein, any storage-related I/O is routed through a virtualized controller. Storage I/O raised by a process running on a node might be directed to local storage (e.g., local solid state drive storage 144, and/or might be directed to local hard disk drive storage 155, and/or might be directed to networked storage 146. Irrespective of the destination of storage pool I/O raised by a node (e.g., whether directed to local storage over a local bus or whether directed to networked storage over a network), the node-specific virtualized controller intercepts storage I/O commands and processes them.

A health monitoring facility can be included in the virtualized controller. Inasmuch as the virtualized controllers intercept storage I/O commands and processes them, the health monitoring facility (e.g., health monitoring facility $105_1$, and health monitoring facility $105_2$) can make observations pertaining to that node's storage I/O irrespective of the destination storage device of the storage pool. Moreover, the switch 110 serves to facilitate interactions between nodes. Strictly as one example, a first node can define a virtual disk, which can in turn be shared by a second node. Any aspect of creation and/or storage I/O operations over the shared virtual disk can be communicated between nodes using the switch. As such, any two of a plurality of nodes in a cluster interact with each other when performing storage I/O commands. Observations made by the virtualized controllers that intercept storage I/O commands as well as the nature of the interactions between nodes can be captured in persistent storage in the storage pool 116.

Specifically, and as shown, observations made by—and results of analysis performed by—the virtualized controllers can be captured in persistent storage in the form of health check metadata 148. The virtualized controllers can be implemented as virtual machines that run over a hypervisor (e.g., hypervisorA 131 or hypervisorE 133), or can be implemented as an executable container (e.g., a Docker container). In the embodiment shown, the health monitoring facility is hypervisor-agnostic, at least to the extent that a health monitoring facility can perform its functions regardless of which hypervisor type (e.g., hypervisorA 131 or hypervisorE 133) is serving the respective node.

Certain aspects of the architecture of FIG. 1A1, in particular the aspect that health check metadata 148 is stored in a shared storage facility, can be compared with alternative architectures.

Figure 2:
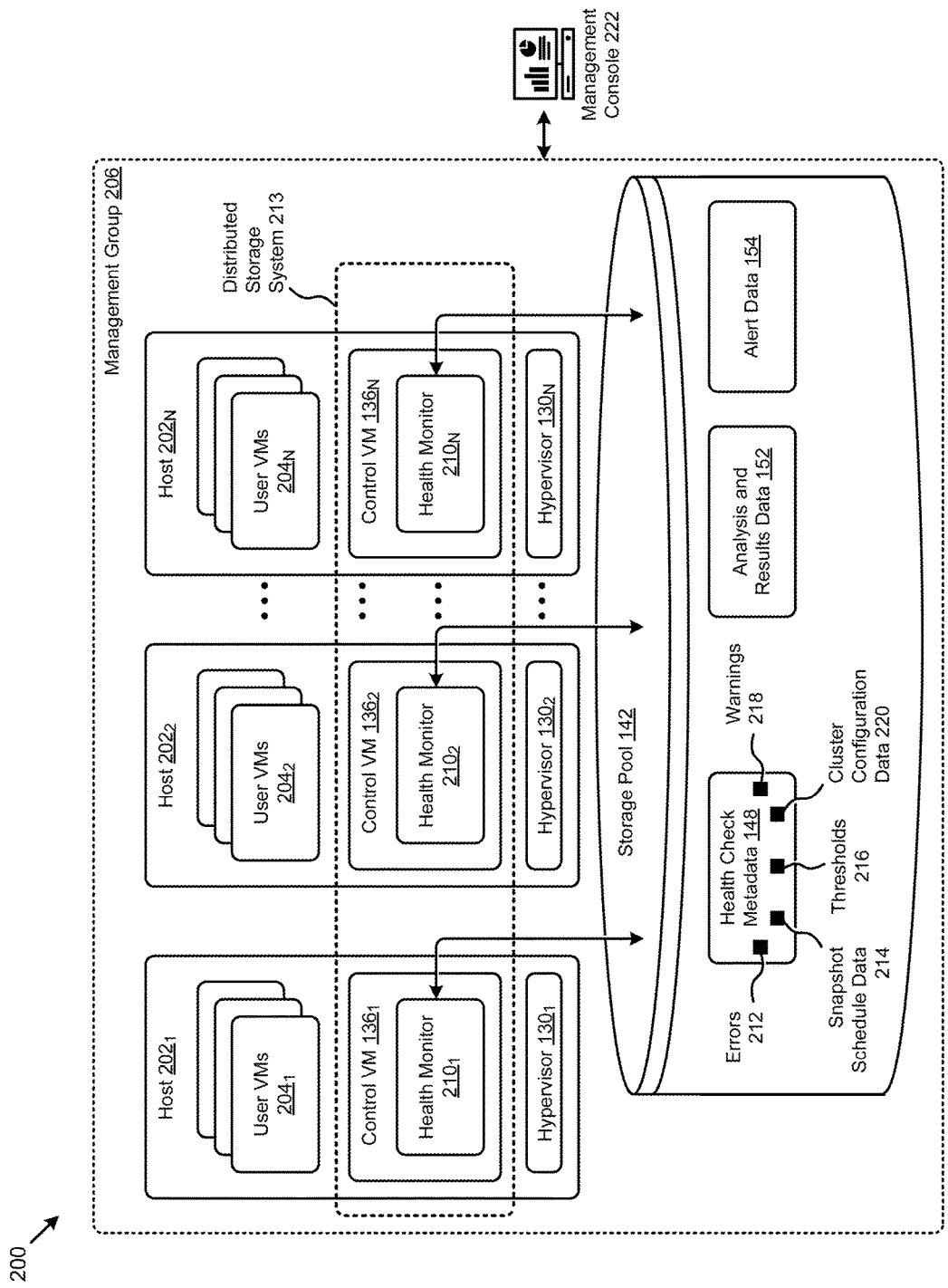

Strictly as one example for comparison, FIG. 1A2 exemplifies a cluster computing environment 1A200 having a central node involved in cluster health monitoring. The central node receives communications (e.g., observations) from the computing nodes of the cluster (e.g., Node0, Node1, Node2), and performs some analysis over the received data before sending the results of the analysis onward. As shown, the results of the analysis can be sent over a network to a report generator, which in turn outputs cluster health reports. A cluster such as is depicted as cluster computing environment 1A200 can be further configured with a deployment of a swarm of observation agents (e.g., possibly in master/slave relationships).

Figure 3:
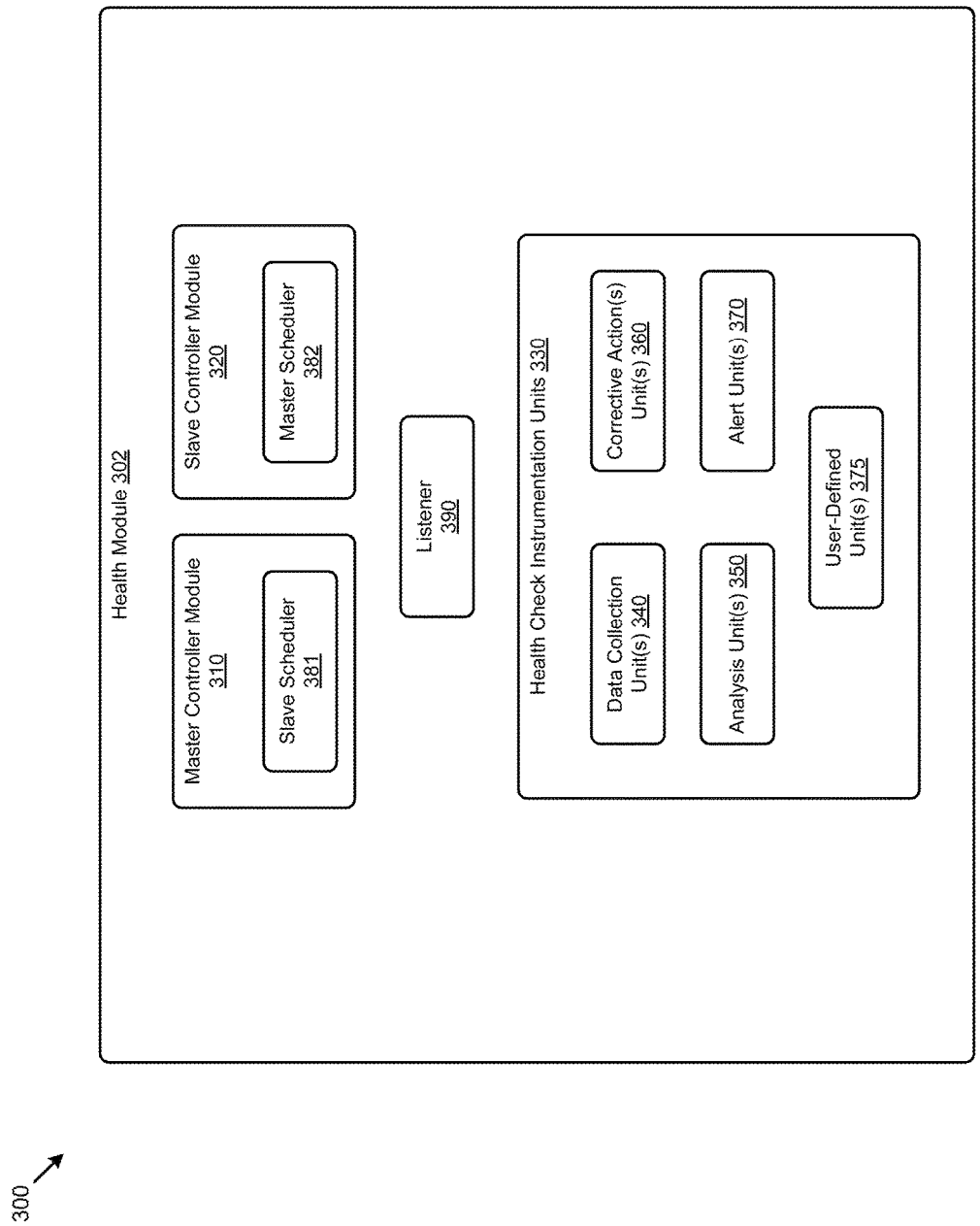

FIG. 1A3 exemplifies a cluster computing environment 1A300 having distributed master and slave components to implement cluster-wide virtual machine health monitoring. As shown, some of the functions of the aforementioned central node can be brought into one or more master components (e.g., master component $114_0$), and some of the aforementioned observation agents can be brought into slave components (e.g., slave1 component $122_1$, slave2 component $122_2$). The cluster (e.g., clusterA 108) can be configured with a switch 110 that interconnects the nodes (e.g., Node0 $112_0$, Node1 $112_1$, Node2 $112_2$). In this and other embodiments, any of the observations (e.g., observed event $149_1$, observed event $149_2$) taken or received by one particular node can be communicated to another node (e.g., over the switch), or can be shared with a group of other nodes (e.g., using the storage facility to store observed events 149). As shown, slave2 component $122_2$ captures observed event $149_1$, and sends (e.g., over a switch) to master component $114_0$, which is received as observed event $149_2$. Strictly as examples, the functions provided by slave components include functions to observe (e.g., observe $124_1$, and observe $124_2$), functions to analyze (e.g., analyze $118_1$, and analyze $118_2$), and functions to send (e.g., send $116_1$, and send $116_2$).

Inter-node communication (e.g., over the switch or as stored in the storage facility), and the option to deploy a master component and any of the slave components onto any processor brings resilience to the deployment. Some failure scenarios are shown and described in certain of the following figures.

Any node capable of running a master task can engage in a series of steps, possibly involving a protocol, to self-elect itself as a master, update itself with a then-current image of a master process, and can also perform analysis over the received data before sending the results of the analysis onward. Nodes that are capable of running slaves can invoke a slave process from an image, and can remain a slave until such time as a slave is self-elected as a master. As shown, the results of the analysis can be sent over a network to a report generator, which in turn outputs cluster health reports 102.

Failure and recovery scenarios are depicted in the following figures.

FIG. 1B1 exemplifies a single observation node failure scenario 1B100 that is remediated by having distributed master and slave components to implement cluster-wide virtual machine health monitoring. A new instance of a master task and/or a slave task can be invoked on any node of the cluster at any moment in time. Moreover, when such an instance of a master task and/or a slave task is invoked, the task will access the health check metadata 148 (e.g., metadata stored as data 128 in the storage pool 142) so as to retrieve a then-current version of the health check metadata.

The shown scenario depicts detection of a failure event or some severe alert that occurs pertaining to Node0 $112_0$. Prior to the failure event, Node0 hosts a master component $114_0$. Upon detection of the failure event that occurs pertaining to Node0, and upon determination that the functions provided by master component $114_0$ can be moved to another node, the functions provided by master component $114_0$ are redeployed to Node1 $112_1$. Strictly as examples, the functions provided by a master component include a function to receive (receive $120_0$ and receive $120_1$), a function to analyze (e.g., analyze $118_0$ and $118_1$), and a function to send (e.g., send $116_0$, and send $116_1$).

As such, upon detection of a failure event or some severe alert that occurs pertaining to a first node, any one of the other nodes in the cluster can take over functions of the failed node by redeploying the functions (e.g., master functions or slave functions) to a different node. Such a redeployment scenario is shown and discussed as pertains to FIG. 1B2.

FIG. 1B2 exemplifies a master component failure scenario 1B200 that is remediated by retargeting a master component to implement fault-tolerant cluster-wide virtual machine health monitoring.

As indicated in the discussion of FIG. 1B1, upon detection of the failure event that occurs pertaining to Node0, and upon determination that the functions provided by master component $114_0$ can be moved to another node (e.g., Node1 $112_1$), the functions provided by master component $114_0$ are redeployed to Node1 (e.g., the master component shown as $master_{NEW}$). In this specific example, the node to which the master component $master_{NEW}$ (e.g., a new health module) is redeployed is a node that already has a slave component running on that node. Accordingly, that node might be subjected to a load balancing process at some later moment.

The aforementioned master components and slave components can be implemented wholly or partially as agents, modules, and/or threads, and/or can be implemented using or within a virtual machine. An example of a cluster having redeployable virtual machines is given in the following figure.

FIG. 1C exemplifies a hyperconverged cluster 1C00 having redeployable virtual machines to implement change-tolerant reconfigurable cluster-wide virtual machine health monitoring. As an option, one or more variations of hyperconverged cluster 1C00 or any aspect thereof may be implemented in the context of the architecture and functionality of the embodiments described herein. The hyperconverged cluster 1C00 or any aspect thereof may be implemented in any environment.

The embodiment shown in FIG. 1C includes nodes (e.g., Node1 $112_1$, Node2 $112_2$, and Node3$_{NEW}$ 132), master components and slave components implemented as VMs (e.g., master VM 134, slave1 VM 138, slave2 VM$_{NEW}$ 140); hypervisors (e.g., see hypervisor $130_1$, hypervisor $130_2$, hypervisor $130_3$); and control VMs (e.g., see control VM $136_1$, control VM $136_2$, control VM $136_3$). The shown embodiment has sufficient resources such that virtual machines can be used to implement change-tolerant configurations of a cluster. Furthermore, the presence of control VMs and the shown storage pool 142 that is shared between all nodes of the cluster offers sufficient logical and physical infrastructure so as to facilitate a variety of configurations that can implement cluster-wide monitoring of storage-related I/O and the health of components in the logical and/or physical path of the storage commands and any corresponding data. In one implementation, a slave VM hosts a module for detection of the event (e.g., failure events) that occurs pertaining to any node in the cluster. Such a detection can occur due to the observations of the slave VM, or due to receipt by the slave VM of an observed event that pertains to a storage command that is processed by the one or more control VMs.

The storage pool may comprise cluster-wide shared storage (e.g., networked storage 146) that is accessible to all nodes, as well as various forms of node-local storage (e.g., local solid state drive storage 144, local hard disk drive storage 155). The control VMs receive storage I/O commands (e.g., from a node-respective hypervisor) and process the received storage I/O. The control VMs might receive a storage I/O command from a master (e.g., master VM 134), or from a slave (e.g., slave1 VM 138), and such a storage command might result in an access (e.g., READ or WRITE) to storage devices 143 that are included the storage pool 142. The storage pool can serve as a repository for any forms of health check metadata 148, any forms of analysis and results data 152, and any forms of alert data 154.

The hyperconverged cluster 1C00 hosts redeployable virtual machines that can implement change-tolerant reconfigurable cluster-wide virtual machine health monitoring. More specifically, any node within the hyperconverged cluster can host a master VM or a slave VM or both. In certain embodiments, characteristics of the hyperconverged cluster are determined in advance of assigning node hosts to either the master VMs or slave VMs. Then-current characteristics of the hyperconverged cluster can be re-determined after a failure event or alert (e.g., a node goes down, or is taken out of service), and the assignment of workloads pertaining to the master VMs or slave VMs can be dynamically re-determined based on the determined configuration. Some such scenarios are given in the following FIG. 1D1, FIG. 1D2, and FIG. 1D3.

FIG. 1D1 depicts an initial configuration 1D100 of redeployable virtual machines to implement cluster-wide virtual machine health monitoring. As an option, one or more variations of initial configuration 1D100 or any aspect thereof may be implemented in the context of the architecture and functionality of the embodiments described herein. The initial configuration 1D100 or any aspect thereof may be implemented in any environment.

The processing within epoch1 156 as shown in FIG. 1D1 includes a step to determine a then-current cluster configuration (step $162_1$), the results of which determination are used to assign monitoring virtual machines that include master mode tasks and slave mode tasks to available nodes (step $164_1$). As shown, a master mode task $166_1$ sends instructions (e.g., instructions to node $N_1$, instructions to node $N_i$, instructions to node $N_T$, etc.) to other nodes, which other nodes receive the instructions (e.g., using a control VM on the receiving node) and follow the instructions so as to invoke code to implement a slave mode task on itself.

In addition to the mapping and deployment operations performed by a master mode task, the master mode task might receive observations from any of the slave mode tasks, and might assemble observations for storage and/or analysis and/or reporting.

It is possible that a slave component (e.g., a slave node, the I/O facilities of a slave node, a slave mode VM, etc.) might fail. Techniques are needed so as to redeploy a replacement slave. FIG. 1D2 depicts a slave component fault and corresponding remediation.

FIG. 1D2 depicts a slave component fault scenario 1D200 that is remediated using redeployable virtual machines to implement cluster-wide virtual machine health monitoring. As an option, one or more variations of slave component fault scenario 1D200 or any aspect thereof may be implemented in the context of the architecture and functionality of the embodiments described herein. The slave component fault scenario 1D200 or any aspect thereof may be implemented in any environment.

The shown epoch2 158 depicts a duration of steady-state processing, whereby slave tasks (e.g., slave task $168_1$, slave task $168_i$, slave task $168_T$) report observations to a master task and the master task joins the slave-reported observations. At any point during such steady-state processing, it can occur that a slave component fails, and ceases to report observations. Remediation can be in the form of a moving the functions formerly provided by the failed slave node to another node in the cluster. In some cases remediation includes merely noting the failed-state of the downed node, and processing continues without the downed slave. A failure of a master component might include additional options for remediation beyond the remediation steps taken after occurrence of a downed slave component.

FIG. 1D3 depicts a master component fault scenario 1D300 that is remediated using redeployable virtual machines to implement cluster-wide virtual machine health monitoring. As an option, one or more variations of master component fault scenario 1D300 or any aspect thereof may be implemented in the context of the architecture and functionality of the embodiments described herein. The master component fault scenario 1D300 or any aspect thereof may be implemented in any environment.

In epoch3 160, the cluster is reconfigured. A downed master component is detected, and (as shown) the master mode task $166_2$ ceases to function as intended. The downed state of the master mode task can be detected by any computational element. In some embodiments the downed state of the master mode task can be detected by any one of the slave mode tasks, or the downed state of the master mode task can be detected by a standby master mode task.

Upon determination that the active master mode task is down, or at least deemed to be not performing as expected, steps can be taken to re-determine the then-current cluster composition. Specifically, the processing within epoch3 160 includes a step to determine a then-current cluster configuration (step $162_2$), the results of which determination are used to reassign master mode tasks and slave mode tasks to available nodes (step $164_2$). The health check metadata 148 stored in the storage pool can be consulted so as to determine available nodes that are sufficiently healthy so as to accommodate the computing load presented as a consequence of reassignment of the master mode tasks and/or slave mode tasks.

As such, based on the re-determination of the then-current cluster configuration and determination of available nodes that are sufficiently healthy, further steps are taken to reassign a master mode and/or slave tasks to an available node that is sufficiently healthy. In some cases (e.g., when a sub-group of processors are deemed to have failed), then the then-current cluster configuration might demand reassignment of many tasks to available nodes. Upon reassignment, the newly deployed new master mode task $165_{NEW}$ sends instructions to the replacement nodes. As shown, a master mode task sends instructions (e.g., instructions to node $N_{R1}$, instructions to node $N_{Ri}$, instructions to node $N_{RT}$, etc.) to other nodes, which other nodes receive the instructions (e.g., using a control VM on the receiving node) and follow the instructions so as to invoke code on themselves.

FIG. 2 depicts a virtualization environment 200 that can be remediated using redeployable virtual machines to implement cluster-wide virtual machine health monitoring. As an option, one or more variations of virtualization environment 200 or any aspect thereof may be implemented in the context of the architecture and functionality of the embodiments described herein. The virtualization environment 200 or any aspect thereof may be implemented in any environment.

Health Module Virtualization Environment

The embodiment shown in FIG. 2 is merely one example. FIG. 2 shows a distributed platform that contains multiple nodes (e.g., host $202_1$, host $202_2$, and host $202_N$) that manages the storage pool that may implement multiple-tiers of storage. The multiple tiers of storage may include storage that is accessible through a network, such as cloud storage or networked storage (e.g., a storage area network (SAN)). The present embodiment also manages access to local storage that is within or directly attached to the server and/or is within or directly attached to a storage appliance that is to be managed as part of the storage pool 142. Virtual disks (vDisks) can be structured from the storage devices in the storage pool 142. As used herein, the term "vDisk" refers to the storage abstraction that is exposed by a control VM (e.g., see control VM $136_1$, control VM $136_2$, . . . , control VM $136_N$) to be used by respective user VMs (user VM $204_1$, user VM $204_2$, . . . , user VM $204_N$). In some embodiments, the vDisk is exposed via an internet small computer system interface (iSCSI) or network file system (NFS) and is mounted as a virtual disk by a user VM.

As shown, each node runs virtualization software, such as VMware ESXi, Microsoft Hyper-V, or RedHat KVM. The virtualization software includes hypervisors (e.g., hypervisor $130_1$, hypervisor $130_2$, . . . , hypervisor $130_N$) to manage the interactions between the underlying hardware and the one or more user VMs that run user software.

One or more special VMs (e.g., control VM $136_1$, control VM $136_2$, control VM $136_N$) can be used to manage storage and I/O activities. Such special VMs implement portions of the "storage controller" as referred to herein. Multiple such storage controllers coordinate within a cluster. The control VMs are not formed based on specific implementations of hypervisors. Instead, the control VMs run as virtual machines above any hypervisors on any servers. One or more control VMs work together to form a distributed storage system 213 that manages all the storage resources, including locally attached storage, networked storage, and cloud storage. Since the control VMs run above the hypervisors, this means that the current approach can be used and implemented within any virtual machine architecture.

During operation, a control VM exports metadata pertaining to one or more block devices or NFS server targets that appear as vDisks to the client VMs. These disks are virtual, since they are implemented by the software running inside the control VMs. Thus, to the user VMs, the control VMs appear to be exporting a clustered storage appliance that contains some disks. All user data (including the operating system) in the user VMs are materialized on these virtual disks.

Significant performance advantages can be gained by allowing the virtualization system to access and use local (e.g., server-internal) storage as disclosed herein. This is because I/O performance is typically much faster when performing access to local storage as compared to performing access to networked storage across a network. This faster performance for locally attached storage can be increased even further by using certain types of optimized local storage devices, such as SSDs.

Further details regarding methods and mechanisms for implementing components shown in the virtualization environment of FIG. 2 are described in U.S. Pat. No. 8,601,473, which is hereby incorporated by reference in its entirety.

Any one or more of the nodes (e.g., host $202_1$, host $202_2$, and host $202_N$) of the cluster can include a health module (HM) instance (e.g., health monitor $210_1$, health monitor $210_2$, . . . , health monitor $210_N$), and each HM might use a storage pool to store data associated with a node or nodes of the cluster. This arrangement allows the health modules to leverage the distributed nature of the cluster to provide distribution of the workload (see FIG. 1D3) and to provide fault tolerance. Any individual health module, whether in master mode or in slave mode may take observations at the individual node level, and/or may take cluster level observations by using inter-processor communications and/or by accessing the data stored in the storage pool. Furthermore, in some cases the individual cluster-level tasks may be distributed across the nodes of the cluster so as to facilitate any shape or constraints pertaining to resource usage. Strictly as one example, the instructions sent to the nodes in the various epochs can specify that the HMs invoked at a particular node perform only certain tasks, and/or take only certain observations, or run in conformance with one or more resource use constraints.

In the illustrated in FIG. 2, each node may further include multiple user VMs (e.g., user VM $204_1$, user VM $204_2$, user VM $204_N$) running on an associated instance of a respective hypervisor (e.g., hypervisor $130_1$, hypervisor $130_2$, hypervisor $130_N$). Each node can include a control VM. A control VM may have an associated instance of one or more health modules (HMs), any associated instance of which might be implemented as being fully within or partially within a control VM or fully or partially within a virtualized controller in the form of a container. In some scenarios, a health module runs within its own VM instance (e.g., such as a VM instance separate from any control VMs). Instances of the health modules are connected to storage pool 142, which includes health check metadata 148, analysis and results data 152, and alert data 154. Management console 222 is connected to a management group 206, which can include a storage pool 142 to facilitate management of the cluster and to provide access to health module reports.

As illustrated, the individual health modules each access the storage pool 142, which storage pool is configured such that all nodes can both read from and write to the health check metadata 148, analysis and results 152 and alert data 154.

The health check metadata 148 comprises health status information pertaining to any stored results, errors 212, warnings 218, snapshot schedule data 214, thresholds 216, cluster configuration data 220, and/or other stored information. Individual instances of an HM use the health check metadata 148 to track data pertaining to analysis and results data 152 and alert data 154. Cluster-wide access to the health check metadata 148 allows individual instances of the health module access to operate on data generated by one or more other instances.

The analysis and results data 152 comprises data collected or generated as a result of the operation of the health modules. As discussed above, because this data 128 is stored in the storage pool 142 and is accessible across the health modules, cluster-wide operations can be performed on the data by any health module.

Alert data 154 comprises data collected as a result of the issuance of any alerts during operation of the health modules. As discussed above, this data is stored in the storage pool 142, and is accessible by the health modules creating a unified repository for storing alert data. A management console 222 may be provided, whereby the management console provides a graphical interface, a command line interface, or other interfaces for accessing and managing the health modules. Such a console may be used to configure, schedule, or otherwise control the health modules by providing a means of interfacing with the health check metadata 148, analysis and results data 152, and alert data 154.

Health Module Architecture

FIG. 3 illustrates a health module architecture 300 as used to implement cluster-wide virtual machine health monitoring. As an option, one or more variations of health module architecture 300 or any aspect thereof may be implemented in the context of the architecture and functionality of the embodiments described herein. The health module architecture 300 or any aspect thereof may be implemented in any environment.

The embodiment shown in FIG. 3 is merely one example. The health module shown is representative of one architecture of the health monitors depicted in FIG. 2, in which depiction each node has an instance of a health monitor installed. Because each node has an instance of the health monitor installed, the nodes operate independently from each other and can also provide data that may be used for cluster-wide analysis. One or more nodes may be used to perform tasks that address issues at the cluster level such as collecting and/or using data collected from each health module instance or by collecting other cluster level data.

The health module 302 comprises a master controller module 310, a slave controller module 320, schedulers (e.g., see slave scheduler 381 and master scheduler 382), a listener 390, and one or more instances of health check instrumentation units 330, which may further comprise instances of data collection units 340, analysis units 350, corrective action units 360, alert units 370, and user-defined units 375. The health module may comprise software, hardware or some combination thereof.

The health check instrumentation units 330 can be used to collect and analyze data to identify issues, and in some cases correct or remediate for identified issues and generate alerts based on activities. The units operate under the direction of the individual master controller module and/or the slave controller modules within the instance of the health module. Operation under the direction of the slave controller module 320 (slave mode) can be used to perform tasks that are specific to the node level. Operation under the direction of the master controller module 310 (master mode) can be used to perform tasks that operate at the cluster level. Because the health module instances include both the units and the modules, any individual node's health module is capable of performing the same operations as another individual node's health module. This provides ease of distribution of the workload across the clustered virtualization environment. More specifically, the instructions can be sent to any instance of a health module to instruct it to operate as a master, as a slave, or as both.

The discussion of FIG. 1D1 through FIG. 1D3 depict one possible technique for assigning tasks to nodes. Any individual node can operate on its own schedule. For example, a slave scheduler might poll or otherwise check for heartbeat signals from an active master mode task and/or a standby master mode task, and a schedule for such polling can be specified on a per-node basis. Scheduling and changes to the schedule can be handled in each node's health module by using the listener 390 to receive new schedules and/or changes to schedules as may be written to the storage pool. For example, a management task may invoke a listener process or thread, which listener process or thread periodically monitors the health check metadata 148 to determine if a change has occurred such that the scheduler needs be updated. The listener notifies the scheduler that it needs to address a scheduling item, which in turn causes the scheduler to receive or fetch the relevant scheduling information. The scheduler enforces the operation of the health module as indicated by the scheduling information. Because each node has a listener and a scheduler, a single update to the schedule can cause each node to be updated to the same cluster-wide schedule. Alternatively, since each health module runs independently on each node, each node can operate on a node-specific schedule.

In some embodiments, a particular slave scheduler may be promoted to a master scheduler, where the master scheduler dictates a schedule to be enforced throughout the cluster. Such a system can be used to provide distribution of master level tasks across the node, with the master scheduler assigning master mode tasks or slave mode tasks to individual nodes. Further, the assignments may be assigned and reassigned to different nodes at any time based on various metrics, such as availability of CPU cycles, local storage availability, or temporary memory usage. Such a system provides for better usage of the available resources in the clustered virtualization environment.

The listener 390, as will be described in greater detail in FIG. 12, monitors the status of the health module and the health check metadata 148, and upon detection of a relevant change, will notify a scheduler. The schedulers may schedule any of health check instrumentation units 330 to operate at any interval, to operate separately, to operate as a whole, or any combination thereof. Furthermore, the schedule may schedule the health check instrumentation units 330 of one health module to operate at the same time as the health check instrumentation units 330 of another health module.

As shown, the health check instrumentation units 330 may comprise one or more of any combination of the following units: data collection units 340, analysis units 350, corrective action units 360, alert units 370, and user-defined units 375. Any of the aforementioned units may be implemented as a collection of separate plugins, which supports separate operation of each unit with respect to the other units. Furthermore, the collection of plugins facilitates actions taken by an administrator or product developer to add and remove plugins to the health module without requiring an update to the underlying health modules.

The data collection unit(s) can be used to collect information about the individual node that the health module is installed on when operating under the control of the slave controller module 320, or cluster wide information when operating under the control of the master controller module 310. The operation of the data collection unit(s) is further described in FIG. 7.

The analysis unit(s) can be used to analyze the collected information on an individual node that the health module is installed on when operating under the control of the slave controller module 320, or on a cluster wide basis when operating under the control of the master controller module 310. The operation of the analysis unit(s) is further described in FIG. 8.

The corrective action unit(s) can be used to take corrective action(s) based on the analysis of an individual node when operating under the control of a slave controller module 320, or on a cluster wide basis when operating under the control of a master controller module 310. A corrective action can be based on one or more observed events. For example, if a particular process (e.g., a snapshotting process) is observed to be using resources above a threshold, then the corrective action might be to lower the priority of the particular process. The operation of the corrective action unit(s) is further described in FIG. 9.

The alert unit(s) can be used to issue alerts based on the results of analysis or corrective actions under the control of a slave controller module 320, or under the control of a master controller module 310. Furthermore, alert unit(s) may operate under the control of either the slave controller module 320 or the master controller module 310 to issue alerts as a result of node level activities or cluster level activities. The operation of the alert unit(s) is further described in FIG. 10.

The user-defined unit(s) can be realized in whatever form is necessary and may include functions similar to those of the units listed above, alone or in any combination. User-defined unit(s) provide specific user-defined operations to be performed within a clustered virtualization environment.

The slave controller module 320 controls the operation of the health check instrumentation units 330. For instance, the slave controller module 320 may control the execution of health check instrumentation units 330. In one embodiment a health module at a node can collect information such as user VM status, available disk space on the physical media attached to the node, CPU usage, etc., and can then analyze that information to determine if any alerts should be issued. Each node can perform independent self-monitoring and can perform responsive actions separate from other nodes.

The master controller module 310 controls the operation of the health check instrumentation units 330 for cluster wide operations. For instance, the master controller module 310 may use the data collected by any instances of a slave controller module 320 to control cluster level data collection and aggregation such as monitoring the status of the available disk space of the cluster as a whole, or analysis and corrective action(s) for the cluster. The master controller module 310 may perform and/or control cluster level workloads to collect, analyze, take corrective actions, and/or issue alerts. Furthermore, a plurality of nodes may be scheduled to perform different master level tasks thereby distributing the computational burden across the cluster.

The slave controller module 320 and master controller module 310 can run independently of each other. The slave controller module 320 may control the data collection and analysis of its own network traffic, and may control corrective actions to, for instance, change a network setting pertaining to a node that is observed as causing lost packets. The master controller module 310 may control similar functions on a cluster level.

Scheduling Processes

Figure 4:
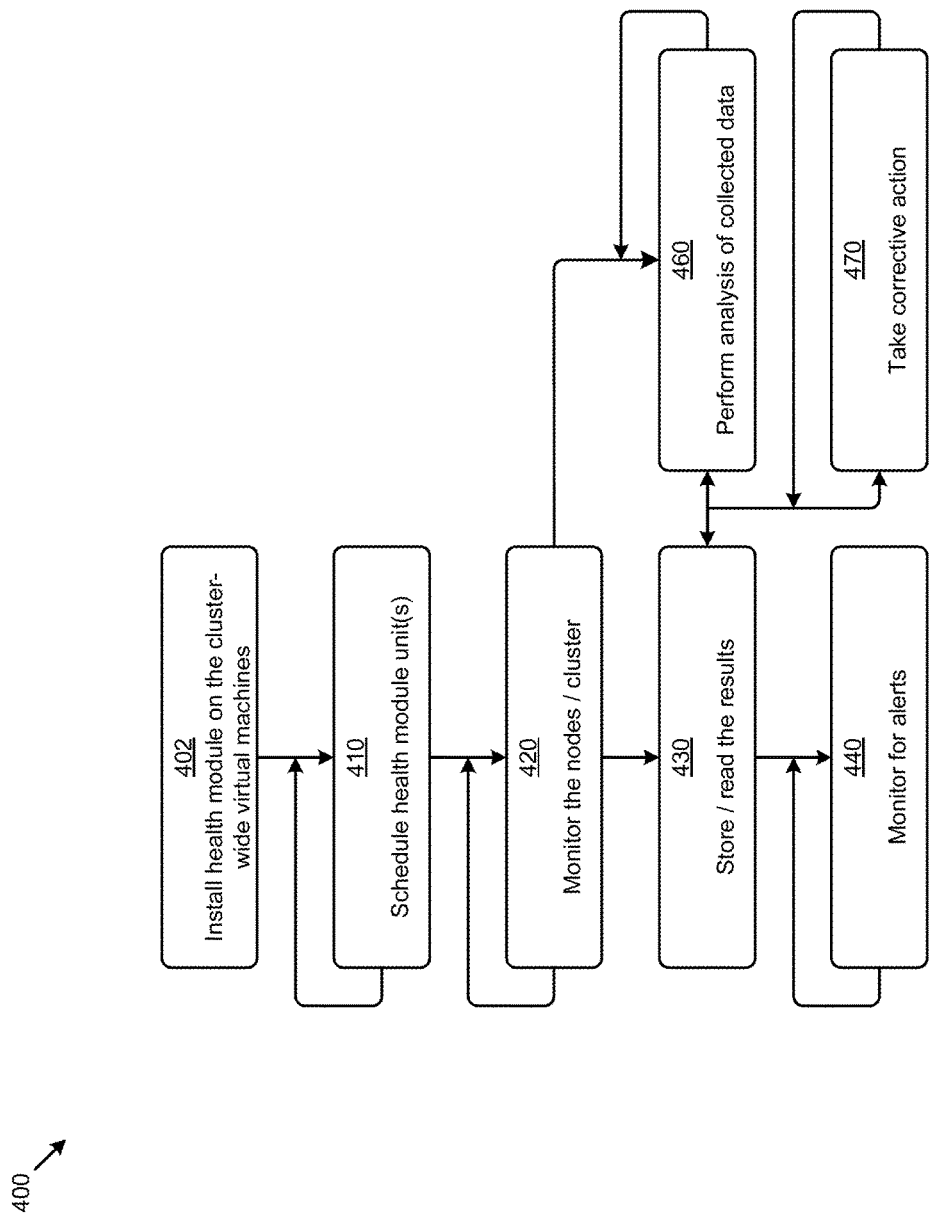
FIG. 4 presents a flowchart showing a remediation flow as used to implement cluster-wide virtual machine health monitoring, according to an embodiment.

FIG. 4 presents a flowchart showing a remediation flow 400 as used to implement cluster-wide virtual machine health monitoring. As an option, one or more variations of remediation flow 400 or any aspect thereof may be implemented in the context of the architecture and functionality of the embodiments described herein. The remediation flow 400 or any aspect thereof may be implemented in any environment.

The embodiment shown in FIG. 4 is merely one example. The figure depicts processes that comprise scheduling the node and/or cluster level tasks of an installed health manager system, and performing and storing monitoring, analysis, corrective actions, and alerts. Because the clustered virtualization environment comprises individual nodes, each including an instance of the health module node, tasks can occur at each node, and cluster level tasks can be distributed across the available nodes.

In this embodiment, the process starts with installation of health modules 302 on the control VMs at step 402, scheduling the operation of the health check instrumentation units 330 at step 410, monitoring of the cluster at step 420, analysis of collected data at step 460, execution of a one or more corrective actions at step 470, and monitoring for any alerts to be issued at step 440. The steps of monitoring the cluster at step 420 and storing results at step 430 can include performance of analysis of collected data at step 460, execution of corrective action at step 470, and monitoring for alerts at step 440.

Installation at step 402 is accomplished by installing of an instance of the health module on the individual nodes. This may be accomplished via a management console with a graphical user interface or a command line or any other means known in the art. Furthermore, as one of ordinary skill in the art would readily recognize, the system could be included in other software packages such as a VM or other installation.

Once installed, the health modules can then be scheduled at step 410 to perform selected operations at periodic intervals. The intervals could be the same for all tasks or could be varied by type, by computational complexity, by available resources, or by other factors to facilitate more efficient usage of the cluster or node and to lower any impact to user-directed activities that may be in operation using the available resources.

At step 420, the environment is monitored and relevant data is collected and stored (e.g., in an analysis and results data area of the storage pool). Analysis can then be performed at step 460 on the collected data to identify issues or track resource usage, where the analysis is also stored in the analysis and results data area of the storage pool.

Based on the analysis one or more steps may be taken, such as taking corrective actions and/or issuing alerts. Such actions taken are tracked by acts of storing the occurrence of the actions and corresponding results in the analysis and results data area of the storage pool.

User-defined units may be scheduled to operate as deemed appropriate. A user-defined unit may be provided with a schedule and/or an access (e.g., through an application programming interface) to schedules.

Various steps (e.g., step 402, step 410, step 420, step 440, step 460, and step 470) may be repeated at will, possibly on different schedules. In some embodiments, an administrator my invoke any step at any time.

Health Module System Installation Management

Figure 5:
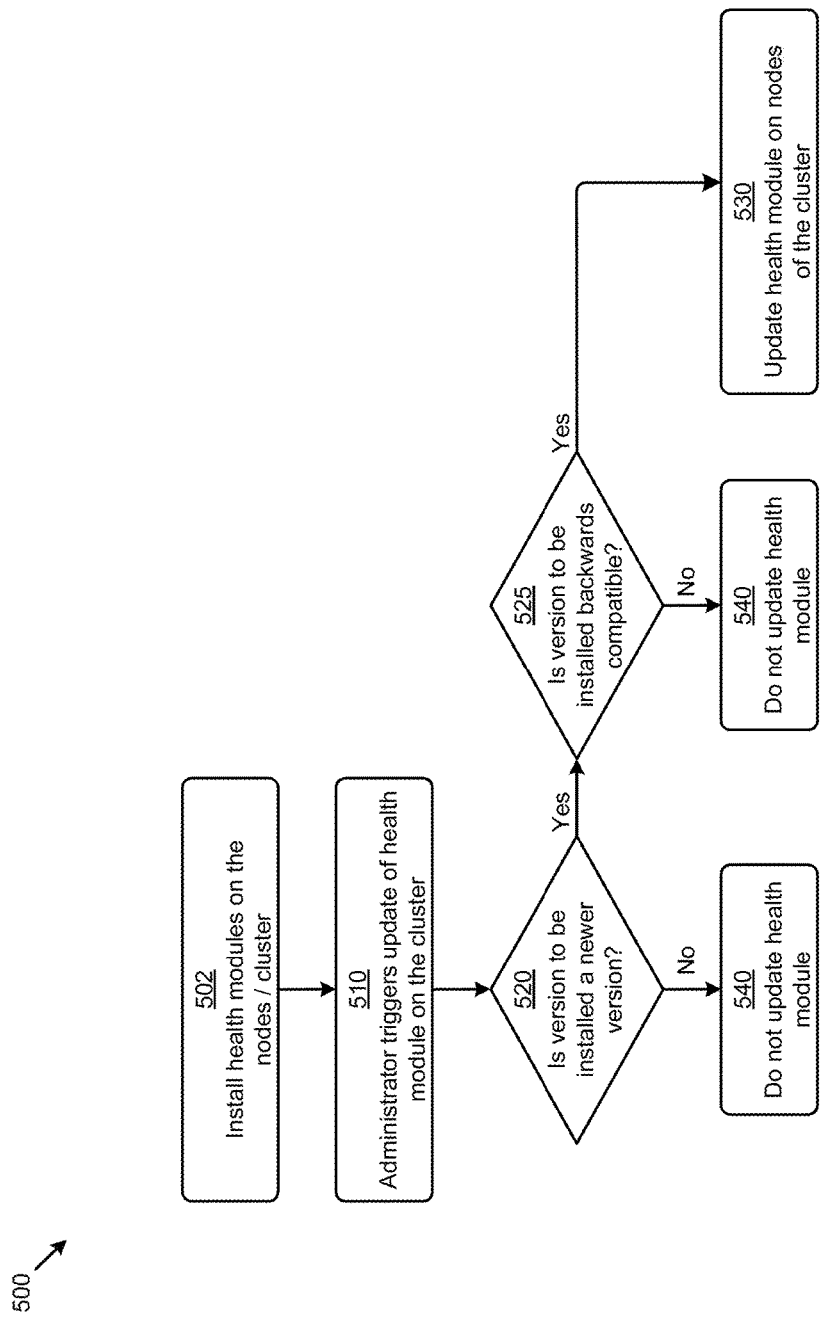
FIG. 5 depicts a flowchart showing an installation process for deploying change-tolerant reconfigurable cluster-wide virtual machine health monitoring components, according to an embodiment.

FIG. 5 depicts a flowchart showing an installation process 500 for deploying change-tolerant reconfigurable cluster-wide virtual machine health monitoring components. As an option, one or more variations of installation process 500 or any aspect thereof may be implemented in the context of the architecture and functionality of the embodiments described herein. The installation process 500 or any aspect thereof may be implemented in any environment.

The embodiment shown in FIG. 5 is merely one example. FIG. 5 illustrates a flowchart of a process for installing and updating a health module system in accordance with some embodiments. The process comprises first installing the health modules on the individual nodes. This may be accomplished via a management console with a graphical user interface or a command line or any other means known in the art. Furthermore, as one of ordinary skill in the art would readily recognize, the system could be included in other software packages such as a control VM or other installation. At some point after the installation of the health modules, an administrator could trigger an update of the health module system, where the system will determine if new health modules should be installed and then install such modules.

Installation comprises installation of health modules on the cluster at step 502, where health modules 302 are install on the control VMs as shown in FIG. 2. This may be accomplished via a management console with a graphical user interface or a command line or any other means known in the art. Furthermore, as one of ordinary skill in the art would readily recognize, the system could be included in other software packages such as a VM or other installation.

The administrator may further trigger an update of the health module system via a management console with a graphical user interface or a command line or any other means known in the art. Furthermore, as one of ordinary skill in the art would readily recognize, the system could be included in other software packages such as a VM or other installation.

In one embodiment, an administrator may trigger an update of the health module system at step 510 by using a graphical interface to execute a one-click update via a provided icon on a management console (e.g., see FIG. 13), by using a command line interface, or any other known method to initiate an update.

After an update is triggered the cluster will check whether the version to be installed is a newer version than the currently installed version at decision 520. If the version to be installed is a newer version, processing proceeds to decision 525 to check for characteristics of backward compatibility. If the backward compatibility tests succeed, the new version will replace all instances of the health module on the individual nodes thereby updating the health module system at step 530, otherwise no update will be applied (step 540).

In other embodiments an administrator may force an install/update through any known means, an installation of an older version, or a reinstallation of the same version.

Adding New Nodes

Figure 6:
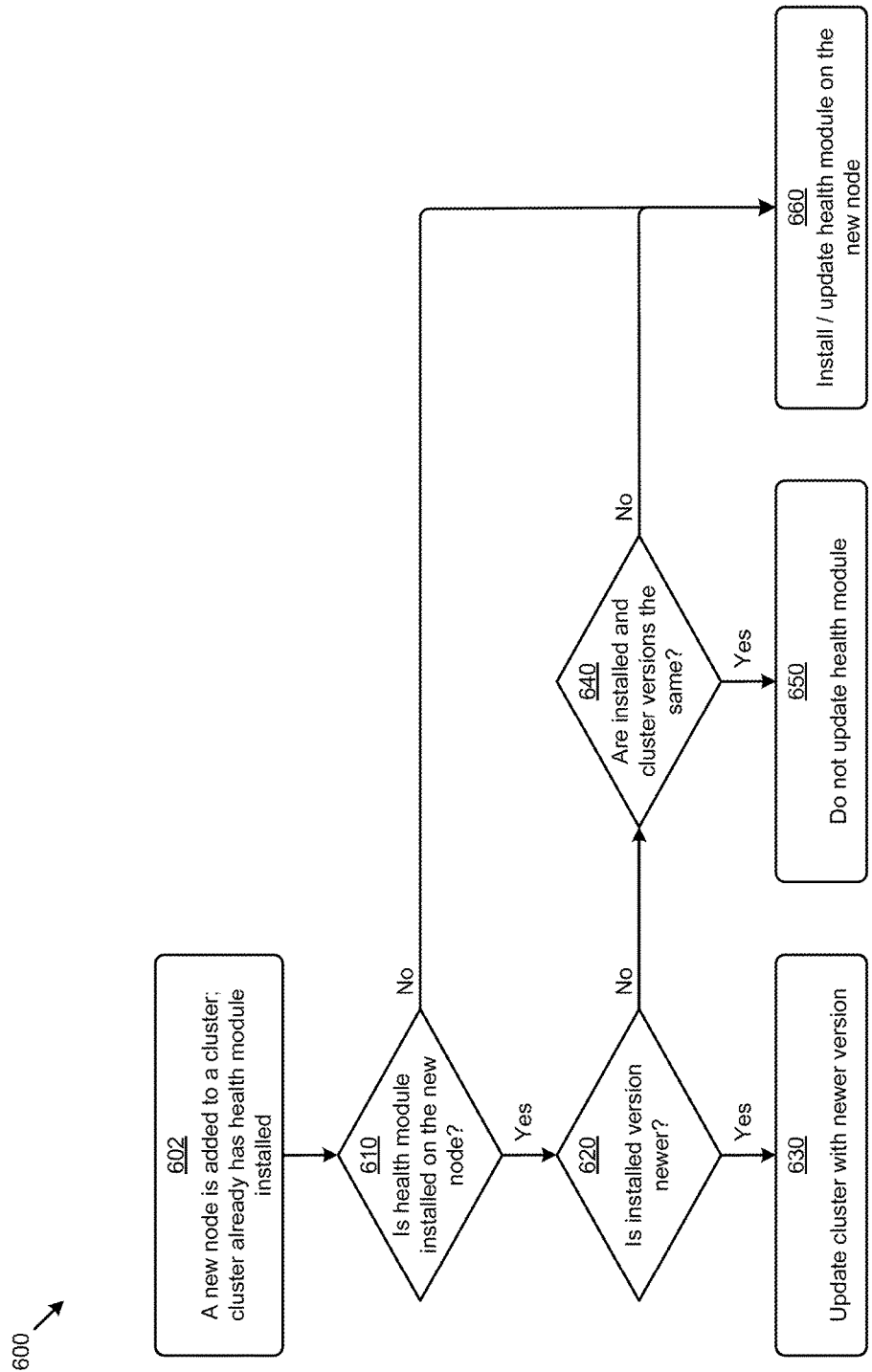
FIG. 6 depicts a flowchart showing a new node configuration process for adding a node into a clustered virtualization environment and insuring that health modules are installed and updated to a selected revision level, according to an embodiment.

FIG. 6 depicts a flowchart showing a new node configuration process 600 for adding a node into a clustered virtualization environment and insuring that health modules are installed and updated to a selected revision level. As an option, one or more variations of new node configuration process 600 or any aspect thereof may be implemented in the context of the architecture and functionality of the embodiments described herein. The new node configuration process 600 or any aspect thereof may be implemented in any environment.

The embodiment shown in FIG. 6 is merely one example. In one embodiment a process to add new nodes will determine if a health module is installed on the node and, if so, it will determine the version. If no version is installed on the node, the then-current version of the health module will be installed on the new node. If there is a version is installed on the node and it is the current version, then the new node will not be updated. If the new node includes a newer version than is installed on the cluster, then the version from the new node will be propagated throughout the cluster. This process provides for a means to automatically update the cluster to maintain version currency and consistency across all instances of the health module.

As shown, the process starts when a new node is added to a cluster that has a health module system installed at step 602. First, the cluster determines if the health module is installed on the new node at step 610. If the new node does not include an instance of the health module, then it will be installed on the new node at step 660. However, if the new node has an instance of the health module installed, the cluster will determine if the new node's version is newer than the cluster's version (step 620). If the new node's version is newer, then it will be installed on the other nodes of the cluster at step 630, otherwise the process goes to step 640 where it is determined whether the new node and the cluster have the same version. If the new node does not have the same version as the cluster, then the version it has must be older than the cluster's installed version and will therefore be updated at step 660, otherwise the installed versions of the node and the cluster are the same and the process terminates at step 650.

In other embodiments an administrator may disable any or all of the described processes for adding a new node, and may manually manage the addition of a new node. For instance, in one embodiment an administrator may force the installation of the cluster version of the health module to be installed on the new node regardless of the whether it has a version installed, or whether the version is or is not newer.

Health Module Data Collection, Analysis, Corrective Actions, and Alert Units

Figure 7:
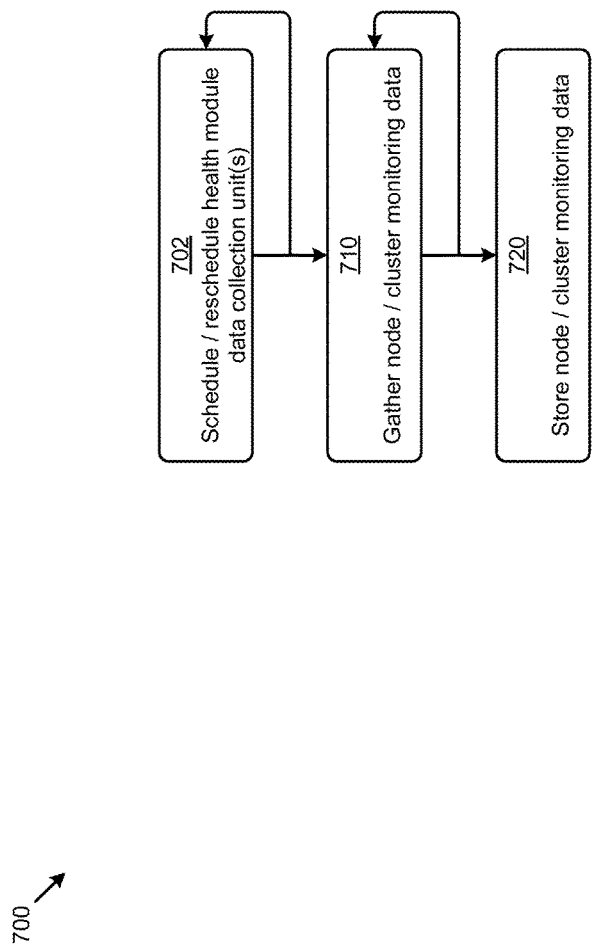
FIG. 7 presents a flowchart showing an operating data monitoring technique as used to implement cluster-wide virtual machine health monitoring, according to an embodiment.

FIG. 7 presents a flowchart showing an operating data monitoring technique 700 as used to implement cluster-wide virtual machine health monitoring. As an option, one or more variations of operating data monitoring technique 700 or any aspect thereof may be implemented in the context of the architecture and functionality of the embodiments described herein. The operating data monitoring technique 700 or any aspect thereof may be implemented in any environment.

The embodiment shown in FIG. 7 is merely one example. The processes comprise setting the schedule for the data collection tasks, gathering node/cluster data, and storing the gathered data in the analysis and results data section of the storage pool.

Initially, the schedule of any particular data collection unit may be set (e.g., at step 702), however the schedule may be modified/rescheduled at any time, and may include different schedules for different data collection units. Further, the same data collection unit may have one schedule for data collection under the control of the slave controller module 320, and a different scheduled for data collection under the control of the master controller module 310. The scheduled data collection unit(s) will gather (step 710) and store the gathered data (step 720) on the storage pool 142. In another embodiment, any of the data collection unit(s) may pass the gathered data directly to an analysis unit(s) in addition to storing the gathered data.

In some embodiments the data collection unit(s) may gather hardware data, user VM data, control VM data, hypervisor data, network data, and/or other data. In yet another embodiment, an administrator may install custom data collection unit(s) 340 which may address concerns particular to the installed system.

Analysis Units

Figure 8:
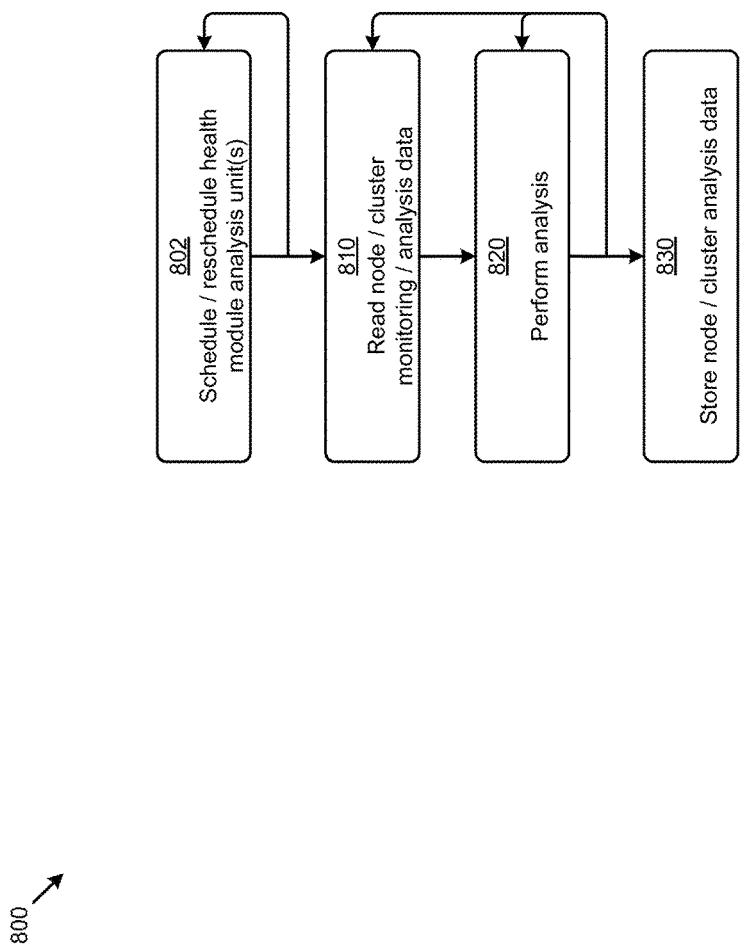
FIG. 8 presents a flowchart showing a data analysis technique as used to implement cluster-wide virtual machine health monitoring, according to an embodiment.

FIG. 8 presents a flowchart showing a data analysis technique 800 as used to implement cluster-wide virtual machine health monitoring. As an option, one or more variations of data analysis technique 800 or any aspect thereof may be implemented in the context of the architecture and functionality of the embodiments described herein. The data analysis technique 800 or any aspect thereof may be implemented in any environment.

The embodiment shown in FIG. 8 is merely one example. The shown process comprises setting the schedule for the analysis units, reading node/cluster monitoring/analysis data, and performing analysis of node/cluster monitoring/analysis data before storing the node/cluster analysis data in the analysis and results data section of the storage pool.

Initially, the schedule of any particular analysis unit may be set at step 802, however the schedule may be modified/rescheduled at any time, and may include different schedules for different analysis unit(s) 350. Further, the same analysis unit may have one schedule for analysis under the control of the slave controller module 320, and a different scheduled for analysis under the control of the master controller module 310.

At step 810, the available monitored data and potentially any previously stored analysis data is read from the storage pool 142. The data stored in the analysis and results data section of the storage pool may comprise node level data, cluster level data, or both. During operation of an analysis unit under the master controller module such data would comprise data from multiple nodes, cluster level data, or both.

At step 820 analysis is performed, and may be repeated at any interval so as to integrate additional data from operations of step 810. In some embodiments the analysis unit(s) may analyze hardware data, user VM data, control VM data, hypervisor data, network data, or other data.

The analysis unit(s) will store the gathered data at step 830 in the analysis and results data section of the storage pool 142. In another embodiment, the analysis unit(s) may also pass the gathered data directly to corrective action units or to the alert units.

In yet another embodiment, an administrator may install custom analysis unit(s) 350 which may address concerns particular to the installed system.

Taking Corrective Action

Figure 9:
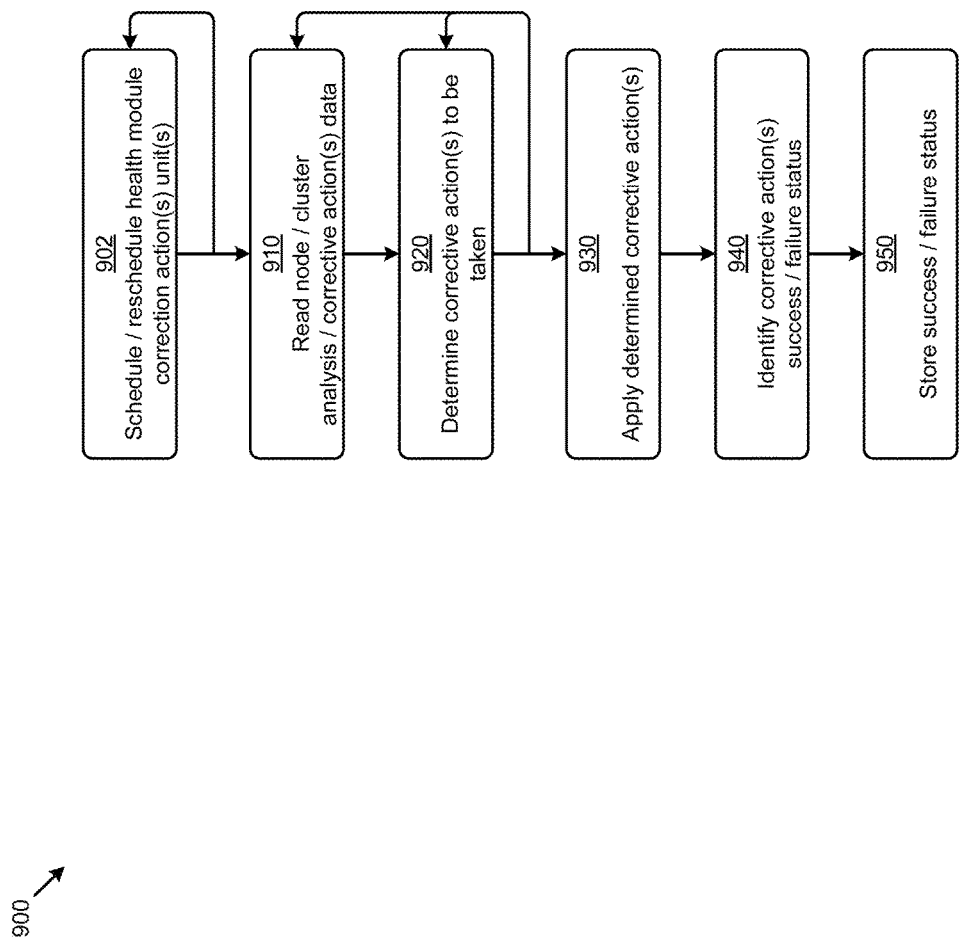
FIG. 9 presents a flowchart showing a remediation technique as used to implement cluster-wide virtual machine health monitoring and remediation, according to an embodiment.

FIG. 9 presents a flowchart showing a remediation technique 900 as used to implement cluster-wide virtual machine health monitoring and remediation. As an option, one or more variations of remediation technique 900 or any aspect thereof may be implemented in the context of the architecture and functionality of the embodiments described herein. The remediation technique 900 or any aspect thereof may be implemented in any environment.

The embodiment shown in FIG. 9 is merely one example. The shown process comprises setting the schedule for the corrective action units, reading node/cluster analysis/corrective action data, determining a corrective action or actions to be taken, application of the corrective action, verification of the success or failure status of the corrective action, and storing the result of the corrective action in the analysis and results data section of the storage pool.

Initially, the schedule of any particular corrective action unit may be set at step 902, however the schedule may be modified/rescheduled at any time, and may include different schedules for different corrective action units. Further, the same corrective action unit may have one schedule for corrective actions under the control of the slave controller module, and a different schedule for corrective actions taken under the control of the master controller module.

At step 910, the available analysis data and potentially any previously stored corrective action data is read from the storage pool 142. The data stored in the analysis and results data section of the storage pool may comprise node level data, cluster level data, or both.

At step 920, corrective actions to be taken are determined and may be repeated at any interval, integrating further analysis data from step 910 as it becomes available. In some embodiments the corrective action units may take corrective measures as a result of the analysis such as changing the settings/configuration of the hardware, user VMs, control VM, hypervisor, network, or other data.

At step 930, the determined corrective actions are applied, and at step 940 the success or failure status of the corrective actions are identified. The status of the application of the identified corrective actions are stored at step 950 in the analysis and results data section of the storage pool. In another embodiment, any of the corrective action units may pass the gathered data directly to an alert unit in addition to storing the gathered data.

In yet another embodiment, an administrator may install custom corrective action units which may address concerns particular to the installed system.

Handling Alerts

Figure 10:
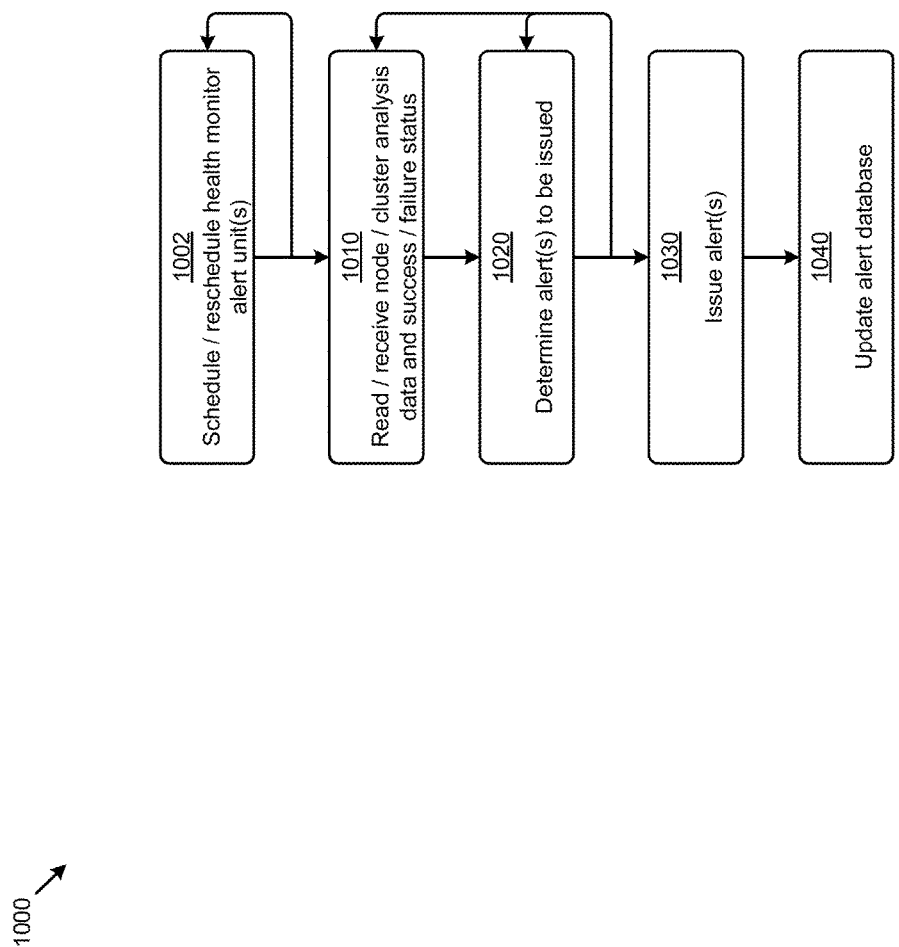
FIG. 10 presents a flowchart showing an alert handling technique as used to implement cluster-wide virtual machine health monitoring and remediation, according to an embodiment.

FIG. 10 presents a flowchart showing an alert handling technique 1000 as used to implement cluster-wide virtual machine health monitoring and remediation. As an option, one or more variations of alert handling technique 1000 or any aspect thereof may be implemented in the context of the architecture and functionality of the embodiments described herein. The alert handling technique 1000 or any aspect thereof may be implemented in any environment.

The embodiment shown in FIG. 10 is merely one example. The shown process comprises setting the schedule for the alert units, reading node/cluster analysis data and success/failure status, determining alerts to be issued, issuance of alerts, and storing the alert information in the alert data section of the storage pool.

Initially, the schedule of any particular alert unit may be set at step 1002, however the schedule may be modified/rescheduled at any time, and may include different schedules for different alert units. Further, the same alert unit may have one schedule for alerts under the control of a slave controller module, and a different scheduled for alerts under the control of a master controller module.

At step 1010, the available data is read from the storage pool 142. The data stored in the analysis and results data section of the storage pool such data may comprise node level data, cluster level data, or both. At step 1020, alerts to be issued are determined. The process may be repeated at any interval so as to integrate further analysis data from step 1010 as it becomes available. In some embodiments the alert units may issue alerts based on analysis results or based on the potential for corrective actions to be taken. For instance, notification of analysis performed and/or corrective action recommendations relevant to the settings/configuration of the hardware, user VMs, control VM, hypervisor, network, or other data can be presented as an alert such that an IT manager would observe the occurrence of automatic remediation and/or take remedial action. Alerts may comprise any known techniques such as emails, push notifications, text messages, popups, or other icons or symbols on a user interface.

At step 1030, the determined alerts are issued. The alert data 154 in the storage pool 142 is updated (step 1040) and further steps are taken for logging the alert occurrence and/or any related alert activity.

Health Module Scheduling

Figures 11A, 11B:
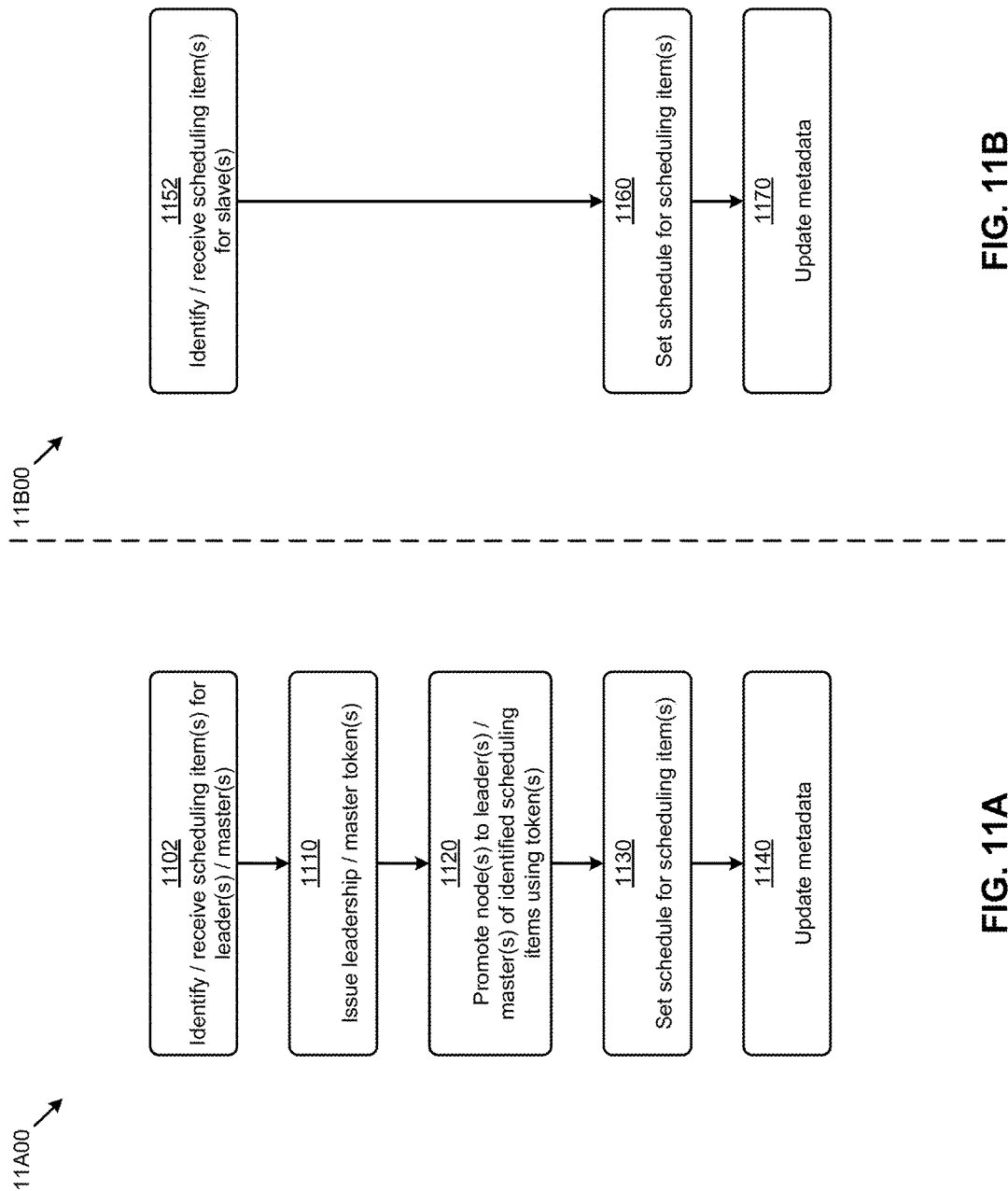
FIG. 11A presents a flowchart showing a master task rescheduling technique as used to implement cluster-wide virtual machine health monitoring and remediation, according to an embodiment.
FIG. 11B presents a flowchart showing a slave task rescheduling technique as used to implement cluster-wide virtual machine health monitoring and remediation, according to an embodiment.

FIG. 11A presents a flowchart showing a master task rescheduling technique 11A00 as used to implement cluster-wide virtual machine health monitoring and remediation. As an option, one or more variations of master task rescheduling technique 11A00 or any aspect thereof may be implemented in the context of the architecture and functionality of the embodiments described herein. The master task rescheduling technique 11A00 or any aspect thereof may be implemented in any environment.

The embodiment shown in FIG. 11A is merely one example. The scheduler provides a mechanism whereby individual tasks can be scheduled for the health module system. Each individual task may comprise either a node level task (e.g., within a slave controller module) or a cluster level task (e.g., within a master controller module). Such tasks can comprise an assortment of data gathering, analysis, corrective actions, and alert tasks, such as have been described above.

Initially the scheduler may receive one or more scheduling items. Depending on whether a scheduling item is a master mode task or slave mode task, the process will follow the steps illustrated in FIG. 11A (e.g., pertaining to master mode task scheduling) or as illustrated in FIG. 11B (e.g., pertaining to slave mode task scheduling).

A scheduling item can comprise any master task or slave task behavior that can be performed at a particular time and/or on a time-wise periodic basis. Strictly as examples, a scheduling item might include periodicity of performing analysis, periodicity of issuing alerts in a batch, periodicity of generating reports, periodicity of checking for code updates, etc.

FIG. 11A illustrates a flowchart for operating a scheduler in accordance with some embodiments where the scheduler is scheduling a master mode process. The process comprises receipt of a task to be scheduling as a master task. Once the task is received a token is issued for identification of the task and for assignment to a master task. This token is then used to promote a particular unit of a health module to a master task. The schedule of the task is then set and the health check metadata 148 in the storage pool is updated to reflect the settings.

The process starts at step 1102, where a scheduling item for a master process is received. Upon receipt of the scheduling item, the process at step 1110 begins which is used to generate a master token according to any known technique. The master token can be issued on a scheduling item basis, and can be assigned to any available node as the system determines is appropriate. For instance, if the system determines that a particular node is not being fully used, it may assign master mode tasks to that node. Furthermore, if that node becomes unresponsive for any reason, the system may reassign the master token to another node. In some embodiments, a cluster may support an active master node and a standby master node. In such a case, if the active master becomes unresponsive for any reason, the system may reassign the master token to the standby master.

After the token is generated it may be assigned according to step 1120, where a node is promoted to a master using the token issued in 1110. The schedule for the scheduling item is then set at step 1130 and the health check metadata 148 is updated to reflect this at step 1140.

In another embodiment the scheduler of a particular node may be promoted to master scheduler, and the remaining schedulers are then relegated to slave schedulers. In such an embodiment the master scheduler will dictate the schedule and distribution of master level tasks.

The schedulers operate within the cluster environment and use the storage pool for storage. Accordingly, each individual scheduler may step in to take over for another scheduler. For instance, if a node that is running a master scheduler fails or stops responding appropriately, another scheduler may be promoted to become a master scheduler and may then take over the scheduling function of the failed or stopped master scheduler.

FIG. 11B presents a flowchart showing a slave task rescheduling technique 11B00 as used to implement cluster-wide virtual machine health monitoring and remediation. As an option, one or more variations of slave task rescheduling technique 11B00 or any aspect thereof may be implemented in the context of the architecture and functionality of the embodiments described herein. The slave task rescheduling technique 11B00 or any aspect thereof may be implemented in any environment.

The embodiment shown in FIG. 11B is merely one example. FIG. 11B illustrates a flowchart for operating a slave scheduler. The process comprises receipt of a task to be scheduled as a slave task. Once the task is received the schedule of the task is then set and the health check metadata 148 in the storage pool is updated to reflect this.

The process starts at step 1152, where a scheduling item for a slave process is received. Upon receipt of the scheduling item, the schedule for the scheduling item is then set at step 1160 and the health check metadata 148 is updated to reflect this at step 1170.

In another embodiment, the scheduler will manage the slave mode processes such that the respective individual slave mode processes are each run at the same time. For instance, the schedulers may schedule a data collection of CPU usage rates at some time T1 for all nodes, and further data collection of hard drive usage data at some other time T2 for another set of nodes. As an example, a data collection schedule pertaining to a particular slave mode task can be analyzed, and determined to be too frequent. A master mode task can take corrective action by modifying the schedule of the particular slave task.

A scheduler may be used to schedule health modules on an on-demand basis, such as when an administrator uses a command line, graphical user interface, or other means to invoke the execution of one or more tasks associated with the health module system. In another embodiment an additional master scheduler may be assigned to manage the on-demand operations. Further, the master scheduler may generate tokens that will automatically expire for the operations to ensure that the processes do not run beyond the intended time period.

The processes disclosed in FIG. 11A and FIG. 11B can be repeated at any time to schedule and reschedule operations either independently with respect to the nodes of the cluster, or dependently where the schedules are coordinated such that the operations execute at the same time.

Health Module Listener

Figure 12:
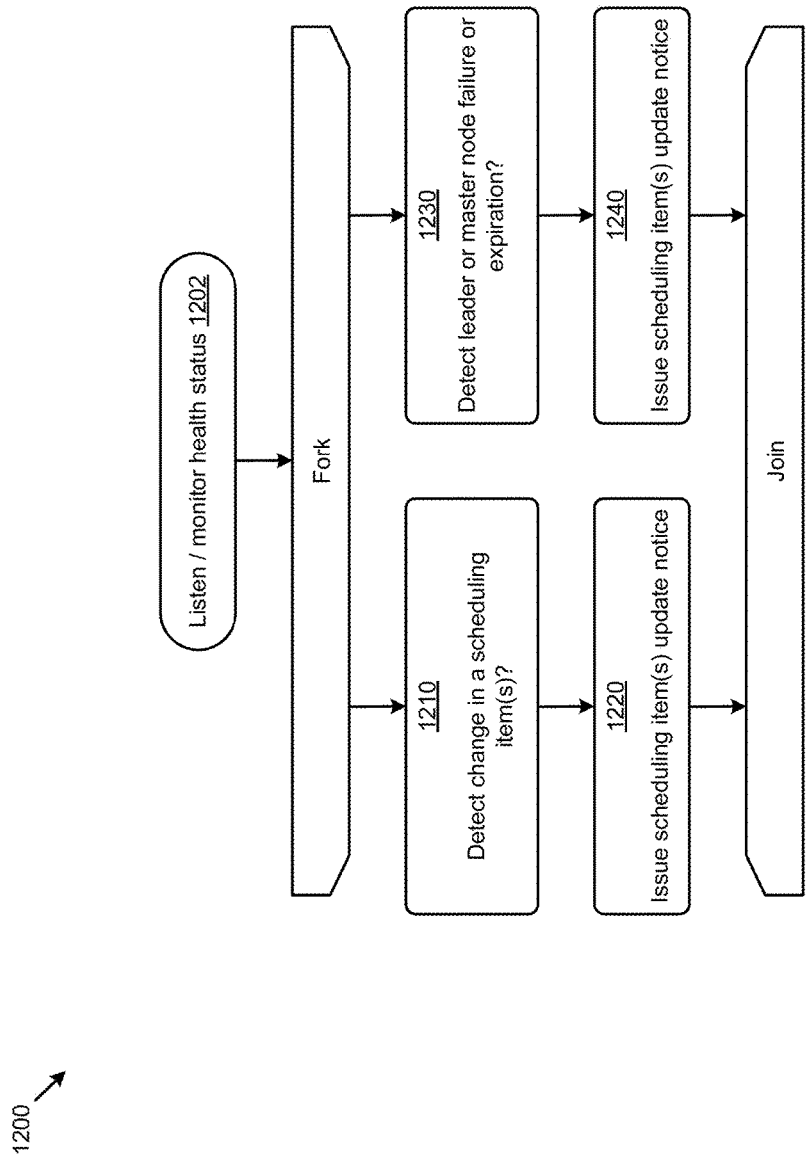
FIG. 12 presents a flowchart showing a set of listener operations as used to implement cluster-wide virtual machine health monitoring and remediation, according to an embodiment.

FIG. 12 presents a flowchart showing a set of listener operations 1200 as used to implement cluster-wide virtual machine health monitoring and remediation. As an option, one or more variations of listener operations 1200 or any aspect thereof may be implemented in the context of the architecture and functionality of the embodiments described herein. The listener operations 1200 or any aspect thereof may be implemented in any environment.

The embodiment shown in FIG. 12 is merely one example. The listener provides a mechanism by which changes to the health check metadata 148 and other status information can be monitored and used to determine when there is a change in a scheduling item or when there is a failure condition detected at a master node. Changes to the schedule may include any combination as to the schedule of items to be executed including, for instance, the addition, modification, or removal of scheduling items. Failure of a master node scheduling item can include the conditions when a master node becomes non-responsive or otherwise unavailable, or can include conditions prevailing when a token expires or is about to expire. Based on detection of a failure condition, the listener module will generate scheduling items for the scheduler to receive.

If the listener module detects a change in a scheduling item, it will issue a scheduling item update notice. Additionally, if the listener detects a master node failure/expiration, it will issue a master scheduling item notice.

The listener 390 will continually listen and monitor for any health module relevant status changes at step 1202. If the listener detects a change in a scheduling item (step 1210), it will then issue a scheduling item update notice at step 1220 that will identify a scheduling item for the scheduler to address as described above.

If the listener 390 detects a master node failure or token expiration for a scheduling item (step 1230), it will then issue a master scheduling item notice at step 1220 that will identify a scheduling item for the scheduler to address. In some cases, and as shown, the listener will issue scheduling instructions to a leader (step 1240).

The listener in each health manager is operative to monitor the health check metadata 148, and the listener module ensures that a modification to the health check metadata 148 will propagate any changes to individual health modules. A single detected change can thusly be propagated for use by any node in the cluster.

Periodic Report Generation and Management Console

Figure 13:
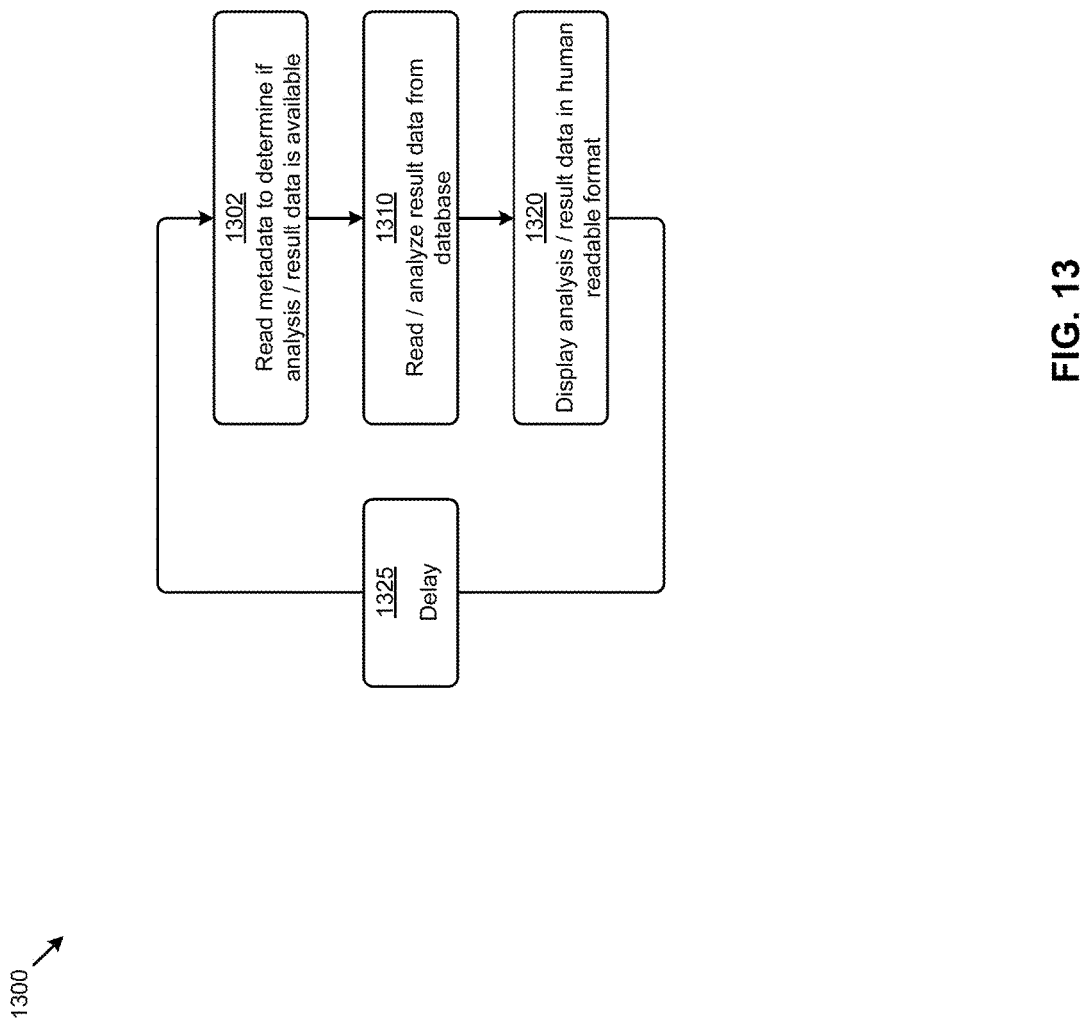
FIG. 13 presents a flowchart showing an ongoing periodic report generation sequence as used to implement cluster-wide virtual machine health monitoring and remediation, according to an embodiment.

FIG. 13 presents a flowchart showing an ongoing periodic report generation sequence 1300 as used to implement cluster-wide virtual machine health monitoring and remediation. As an option, one or more variations of ongoing periodic report generation sequence 1300 or any aspect thereof may be implemented in the context of the architecture and functionality of the embodiments described herein. The ongoing periodic report generation sequence 1300 or any aspect thereof may be implemented in any environment.

The embodiment shown in FIG. 13 is merely one example. A management console (e.g., see FIG. 2) provides a facility for an administrator to interface with the health module system. Such a console may comprise various aspects such as a menus, buttons, icons, charts, tables, graphs, etc. Further, a management console may comprise or integrate a command line interface for control. The management console described herein allows an administrator to manage the health module system and to access the data associated with the health module system. The management console may be separate or may be integrated with other functions associated with a clustered virtualization environment.

The management console can read available health check metadata 148 and analysis and results data 152. The management console may then execute various instructions to display data in a human readable format as discussed above.

Management console 222 will read health check metadata to determine if analysis and results data is available at step 1302. In the event that there is any available analysis and results data, the management console will read it from the storage pool and may perform formatting and/or analysis (step 1310) before sending to a recipient such as a listening agent at a management console. At step 1320, the management console will display the analysis and results data in a human readable format. The foregoing steps can be repeated periodically (e.g., after a delay 1325).

Further, in some embodiments the management console may be used as a control and/or scheduling interface to manage the health module system. The interface may comprise a graphical user interface (GUI) to facilitate an administrator to control the schedule and operational aspects of the health module system including version control, frequency of operations, and types of operations.

Figure 14:
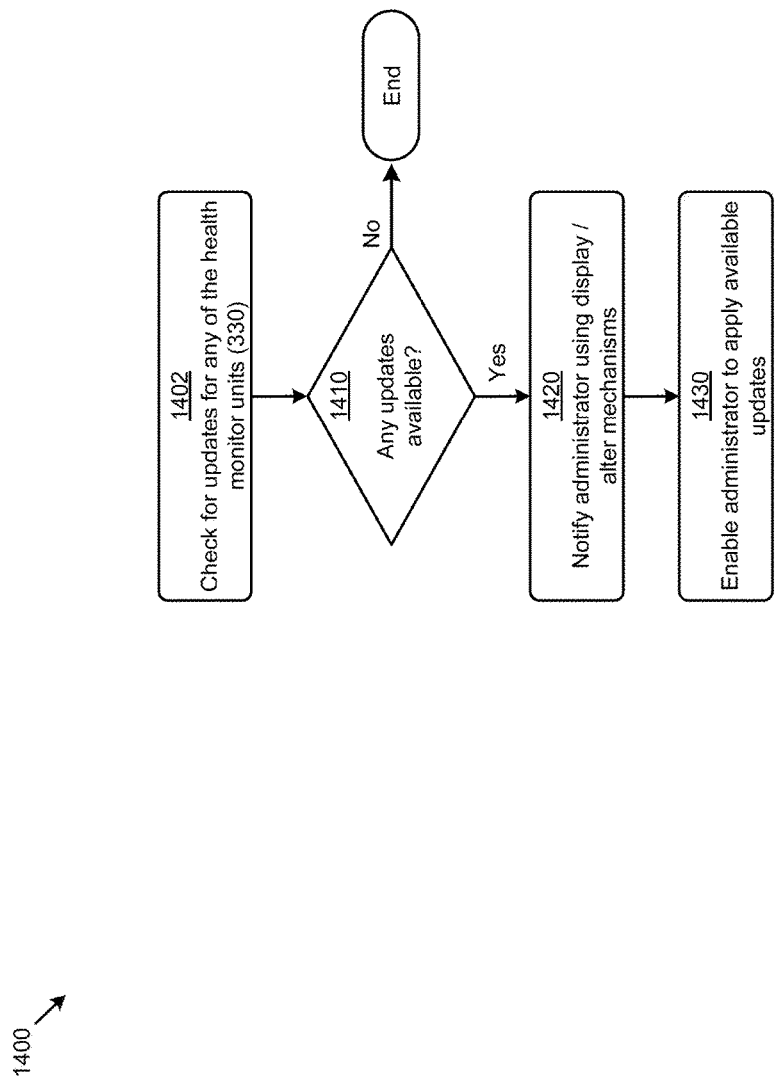
FIG. 14 presents a flowchart showing a version update application technique as used to implement cluster-wide virtual machine health monitoring and remediation, according to some embodiments.

In some embodiments the GUI may include tools to execute the process of FIG. 14, which tools support actions taken by an administrator to rapidly roll out updates to the health module system. The process may be initiated at will or may be scheduled to run periodically (once every S seconds, once every M minutes, once every H hours, once every D days, etc.). Such a process allows an administrator to vary the frequency in which the system can be updated, thereby updating the functionality of the cluster without the need to roll out an update to the underlying user VM components or hypervisors.

Further details regarding general approaches to reporting and visualization are described in U.S. application Ser. No. 15/006,435 titled "ARCHITECTURE FOR IMPLEMENTING USER INTERFACES FOR CENTRALIZED MANAGEMENT OF A COMPUTING ENVIRONMENT" filed on Jan. 26, 2016, which is hereby incorporated by reference in its entirety.

Performing Rolling Updates

FIG. 14 presents a flowchart showing a version update application technique 1400 as used to implement cluster-wide virtual machine health monitoring and remediation. As an option, one or more variations of version update application technique 1400 or any aspect thereof may be implemented in the context of the architecture and functionality of the embodiments described herein. The version update application technique 1400 or any aspect thereof may be implemented in any environment.

The embodiment shown in FIG. 14 is merely one example. The process includes checking for any available updates to the health modules, notifying the administrator of any available updates, and enabling an administrator to apply those updates.

The process begins by checking for updates to the health modules of the individual health check instrumentation units of the health module system at step 1402. If no updates are available the process ends at step 1410 until the next check is scheduled or initiated.

However, if there is an update available update then at step 1420 the administrator is notified using the display or another alert mechanism. At step 1430, the administrator may then apply the available updates.

In another embodiment the administrator may set up one or more rules to determine under what conditions an update should be automatically applied. For instance, the administrator may determine that the updates should always be applied, or that only updates ending in an odd version number should be applied, or that updates can only be applied between 3 AM and 4 AM.

In some embodiments the health module system may be deployed across multiple clusters, and under such circumstances it may be desirable to have a single management console for managing the multiple clusters. In one embodiment a cluster manager VM is used to generate a management console for multiple clusters.

Further details pertaining to management consoles for multiple clusters are described in U.S. application Ser. No. 15/006,416 titled "ARCHITECTURE FOR IMPLEMENTING CENTRALIZED MANAGEMENT FOR A COMPUTING ENVIRONMENT" filed on Jan. 26, 2016, which is hereby incorporated by reference in its entirety.

Multi-Cluster Configurations

Figure 15:
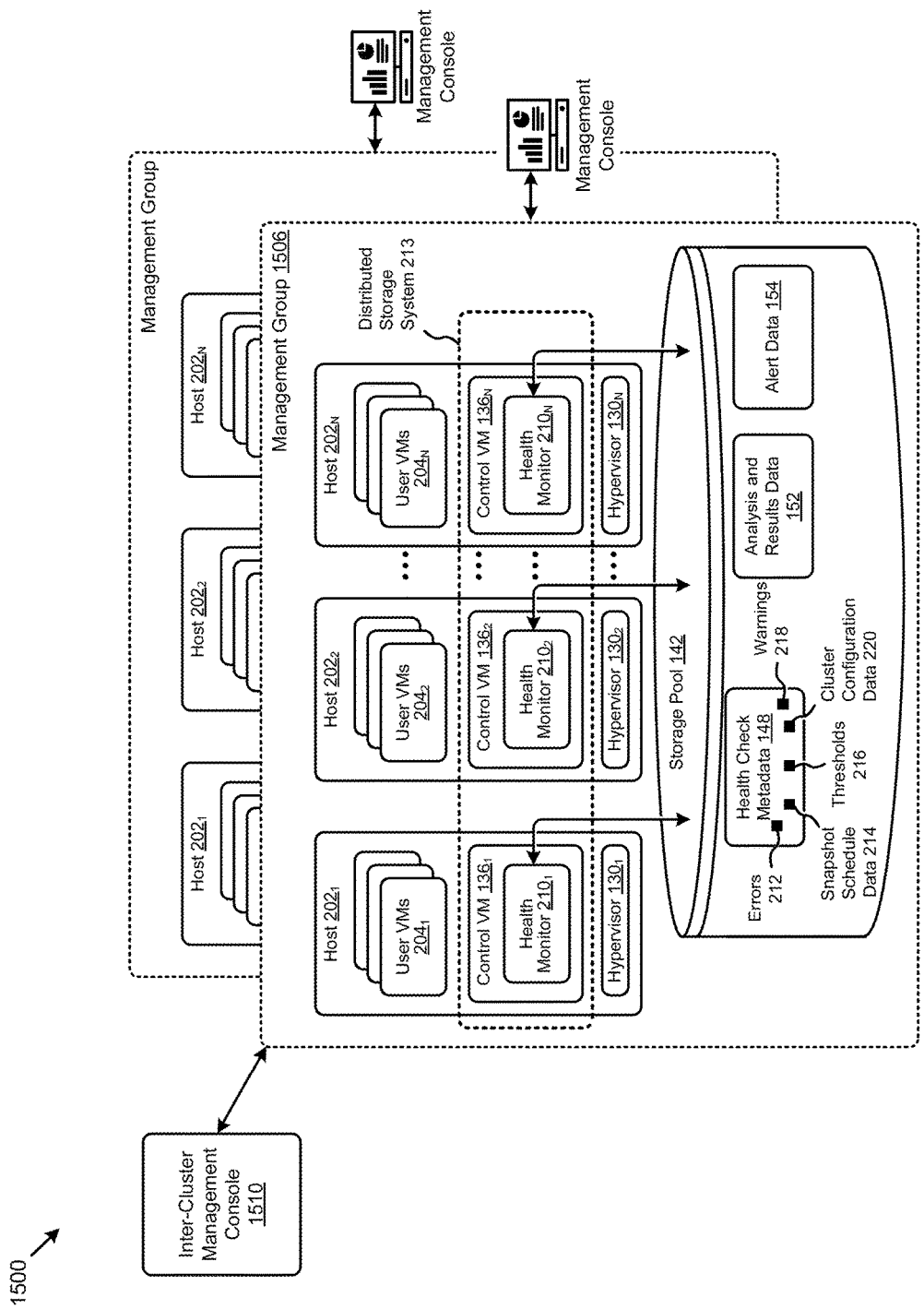
FIG. 15 depicts an inter-cluster console in a multi-cluster environment, according to an embodiment.

FIG. 15 depicts an inter-cluster console in a multi-cluster environment 1500. As an option, one or more variations of multi-cluster environment 1500 or any aspect thereof may be implemented in the context of the architecture and functionality of the embodiments described herein. The multi-cluster environment 1500 or any aspect thereof may be implemented in any environment.

The embodiment shown in FIG. 15 is merely one example. In this virtualization environment, one or more health module systems are deployed over multiple clusters. A cluster manager virtual machine can be used on one or more nodes of each cluster to facilitate control of multiple clusters via an administrator user interface.

An inter-cluster management console 1510 (e.g., implemented by a management console VM) can run on a hypervisor, or as a standalone process, or in an executable container for managing one or more clusters, where the inter-cluster management console VM 1510 can be used to aggregate control of multiple clusters via an administrator user interface.

Each cluster can have multiple masters, and any sets of masters can be subsumed by one or more management group boundaries 1506, which management groups can be independently addressed and managed by an inter-cluster management console 1510.

What has been described are improved methods for implementing a health management system in a clustered virtualization environment. By using the cluster environment for operation of the health module system, redundancy and other benefits of the cluster can be gained. Such systems may be provided without requiring additional hardware but may instead use the clustered virtualization environment.

Furthermore, because the health module instances are installed on the individual control VMs they can have access to those machines for gathering data, or using the cluster to analyze data, or applying corrections to improve the function of the cluster itself or any combination thereof.

Computer System Architectures

Figure 16:
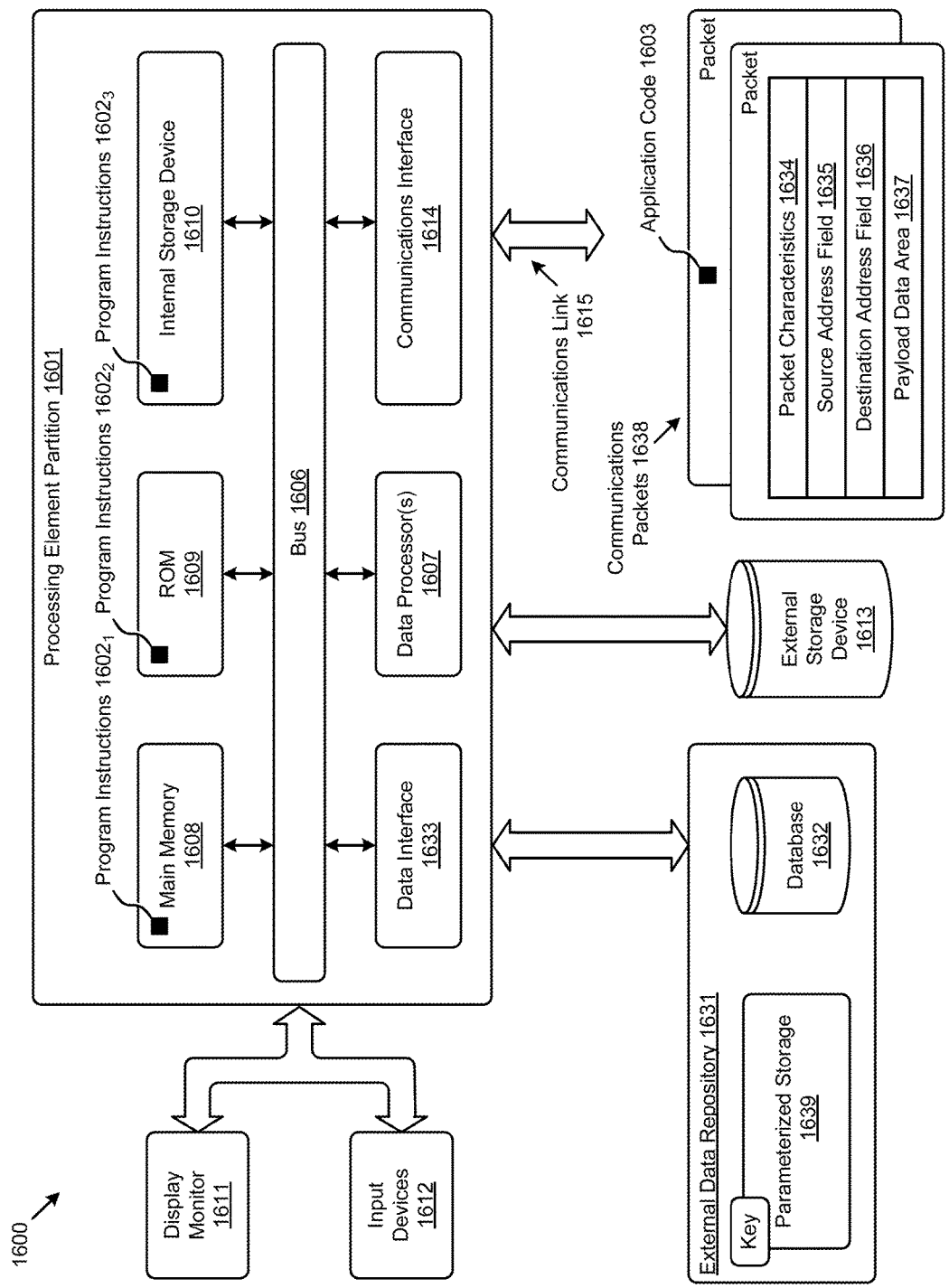
FIG. 16 presents a block diagram showing a computing system suitable for implementing embodiments.

FIG. 16 presents a block diagram showing a computer system 1600 suitable for implementing embodiments. As an option, one or more variations of computer system 1600 or any aspect thereof may be implemented in the context of the architecture and functionality of the embodiments described herein. The computer system 1600 or any aspect thereof may be implemented in any environment.

Computer system 1600 includes a bus 1606 or other communication mechanism for communicating information. The bus interconnects subsystems and devices such as a CPU, or a multi-core CPU (e.g., data processor 1607), a system memory (e.g., main memory 1608, or an area of random access memory (RAM)), a non-volatile storage device or non-volatile storage area (e.g., read-only memory 1609), an internal storage device 1610 or external storage device 1613 (e.g., magnetic or optical), a data interface 1633, a communications interface 1614 (e.g., PHY, MAC, Ethernet interface, modem, etc.). The aforementioned components are shown within processing element partition 1601, however other partitions are possible. The shown computer system 1600 further comprises a display 1611 (e.g., CRT or LCD), various input devices 1612 (e.g., keyboard, cursor control), and an external data repository 1631.

According to an embodiment of the disclosure, computer system 1600 performs specific operations by data processor 1607 executing one or more sequences of one or more program code instructions contained in a memory. Such instructions (e.g., program instructions $1602_1$, program instructions $1602_2$, program instructions $1602_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 1600 performs specific networking operations using one or more instances of communications interface 1614. Instances of the communications interface 1614 may comprise one or more networking ports that are configurable (e.g., pertaining to speed, protocol, physical layer characteristics, media access characteristics, etc.) and any particular instance of the communications interface 1614 or port thereto can be configured differently from any other particular instance. Portions of a communication protocol can be carried out in whole or in part by any instance of the communications interface 1614, and data (e.g., packets, data structures, bit fields, etc.) can be positioned in storage locations within communications interface 1614, or within system memory, and such data can be accessed (e.g., using random access addressing, or using direct memory access DMA, etc.) by devices such as data processor 1607.

The communications link 1615 can be configured to transmit (e.g., send, receive, signal, etc.) any types of communications packets comprising any organization of data items. The data items can comprise a payload data area 1637, a destination address 1636 (e.g., a destination IP address), a source address 1635 (e.g., a source IP address), and can include various encodings or formatting of bit fields to populate the shown packet characteristics 1634. In some cases the packet characteristics include a version identifier, a packet or payload length, a traffic class, a flow label, etc. In some cases the payload data area 1637 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 1607 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 1631, which in turn can be formatted into any one or more storage areas, and which can comprise parameterized storage 1639 accessible by a key (e.g., filename, table name, block address, offset address, etc.).

Execution of the sequences of instructions to practice certain embodiments of the disclosure are performed by a single instance of the computer system 1600. According to certain embodiments of the disclosure, two or more instances of computer system 1600 coupled by a communications link 1615 (e.g., LAN, PTSN, or wireless network) may perform the sequence of instructions required to practice embodiments of the disclosure using two or more instances of components of computer system 1600.

The computer system 1600 may transmit and receive messages such as data and/or instructions organized into a data structure (e.g., communications packets 1638). The data structure can include program instructions (e.g., application code 1603), communicated through communications link 1615 and communications interface 1614. Received program code may be executed by data processor 1607 as it is received and/or stored in the shown storage device or in or upon any other non-volatile storage for later execution. Computer system 1600 may communicate through a data interface 1633 to a database 1632 on an external data repository 1631. Data items in a database can be accessed using a primary key (e.g., a relational database primary key).

The processing element partition 1601 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 1607. Some embodiments include one or more special-purpose hardware components (e.g., power control, logic, sensors, transducers, etc.). A module may include one or more state machines and/or combinational logic used to implement or facilitate the operational and/or performance characteristics of various embodiments.

Additional Embodiments of the Disclosure

Additional Practical Application Examples

Figure 17A:
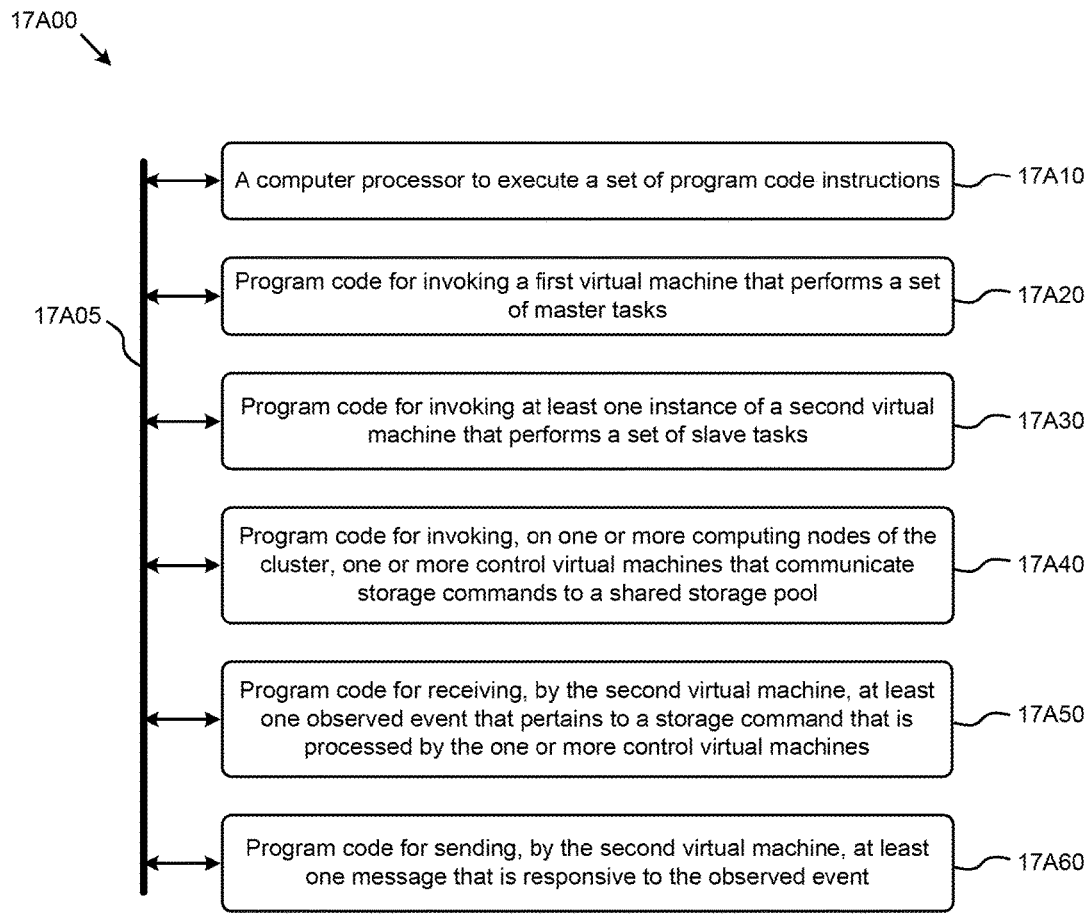
FIG. 17A and FIG. 17B depict system components as arrangements of computing modules that are interconnected so as to implement certain of the herein-disclosed embodiments.

FIG. 17A depicts a system 17A00 as an arrangement of computing modules that are interconnected so as to operate cooperatively to implement certain of the herein-disclosed embodiments. The partitioning of system 17A00 is merely illustrative and other partitions are possible.

FIG. 17A depicts a block diagram of a system to perform certain functions of a computer system. As an option, the system 17A00 may be implemented in the context of the architecture and functionality of the embodiments described herein. Of course, however, the system 17A00 or any operation therein may be carried out in any desired environment.

The system 17A00 comprises at least one processor and at least one memory, the memory serving to store program instructions corresponding to the operations of the system. As shown, an operation can be implemented in whole or in part using program instructions accessible by a module. The modules are connected to a communication path 17A05, and any operation can communicate with other operations over communication path 17A05. The modules of the system can, individually or in combination, perform method operations within system 17A00. Any operations performed within system 17A00 may be performed in any order unless as may be specified in the claims.

The shown embodiment implements a portion of a computer system, presented as system 17A00, comprising a computer processor to execute a set of program code instructions (module 17A10) and modules for accessing memory to hold program code instructions to perform: invoking a first virtual machine that performs a set of master tasks (module 17A20); invoking at least one instance of a second virtual machine that performs a set of slave tasks (module 17A30); invoking, on one or more computing nodes of the cluster, one or more control virtual machines that communicate storage commands to a shared storage pool (module 17A40); receiving, by the second virtual machine, at least one observed event that pertains to a storage command that is processed by the one or more control virtual machines (module 17A50); and sending, by the second virtual machine, at least one message that is responsive to the observed event (module 17A60).

Variations of the foregoing may include more or fewer of the foregoing modules and variations may perform more or fewer (or different) steps, and may use data elements in more or fewer (or different) operations.

Variations include:

Variations that include acts for detecting, by the second virtual machine, an interruption of service of the first virtual machine and invoking an instance of a new monitoring virtual machine that performs the set of master tasks.

Variations that include acts for logging an occurrence of an alert based at least in part on the observed event.

Variations that include acts for updating an alert database based at least in part on the alert.

Variations that include acts for initiating a corrective action based at least in part on the observed event.

Variations that include acts for determining a version identifier of a first monitoring virtual machine and replacing the instance of the first monitoring virtual machine with a new instance of the first monitoring virtual machine having a newer version.

Variations that include acts for determining a data collection schedule pertaining to the second virtual machine and modifying the data collection schedule.

Variations where the storage commands are communicated over a network.

Variations that include acts for invoking a listener thread to detect a change in a scheduling item.

Figure 17B:
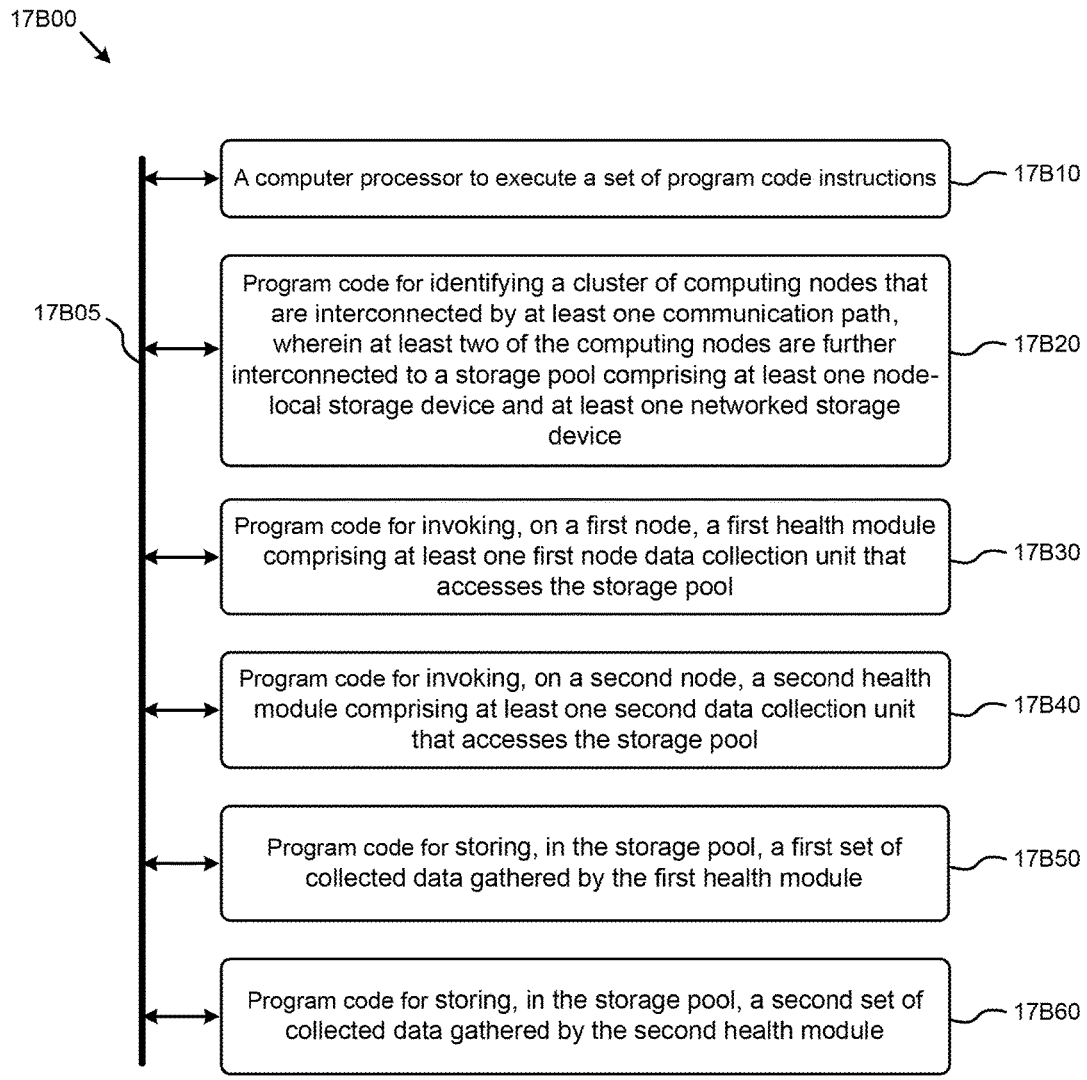

FIG. 17B depicts a system 17B00 as an arrangement of computing modules that are interconnected so as to operate cooperatively to implement certain of the herein-disclosed embodiments. The partitioning of system 17B00 is merely illustrative and other partitions are possible. As an option, the system 17B00 may be implemented in the context of the architecture and functionality of the embodiments described herein. Of course, however, the system 17B00 or any operation therein may be carried out in any desired environment. The system 17B00 comprises at least one processor and at least one memory, the memory serving to store program instructions corresponding to the operations of the system. As shown, an operation can be implemented in whole or in part using program instructions accessible by a module. The modules are connected to a communication path 17B05, and any operation can communicate with other operations over communication path 17B05. The modules of the system can, individually or in combination, perform method operations within system 17B00. Any operations performed within system 17B00 may be performed in any order unless as may be specified in the claims. The shown embodiment implements a portion of a computer system, presented as system 17B00, comprising a computer processor to execute a set of program code instructions (module 17B10) and modules for accessing memory to hold program code instructions to perform: identifying a cluster of computing nodes that are interconnected by at least one communication path, wherein at least two of the computing nodes are further interconnected to a storage pool comprising at least one node-local storage device and at least one networked storage device (module 17B20); invoking, on a first node, a first health module comprising at least one first node data collection unit that accesses the storage pool (module 17B30); invoking, on a second node, a second health module comprising at least one second data collection unit that accesses the storage pool (module 17B40); storing, in the storage pool, a first set of collected data gathered by the first health module (module 17B50); and storing, in the storage pool, a second set of collected data gathered by the second health module (module 17B60).

System Architecture Overview

Additional System Architecture Examples

Figure 18A:
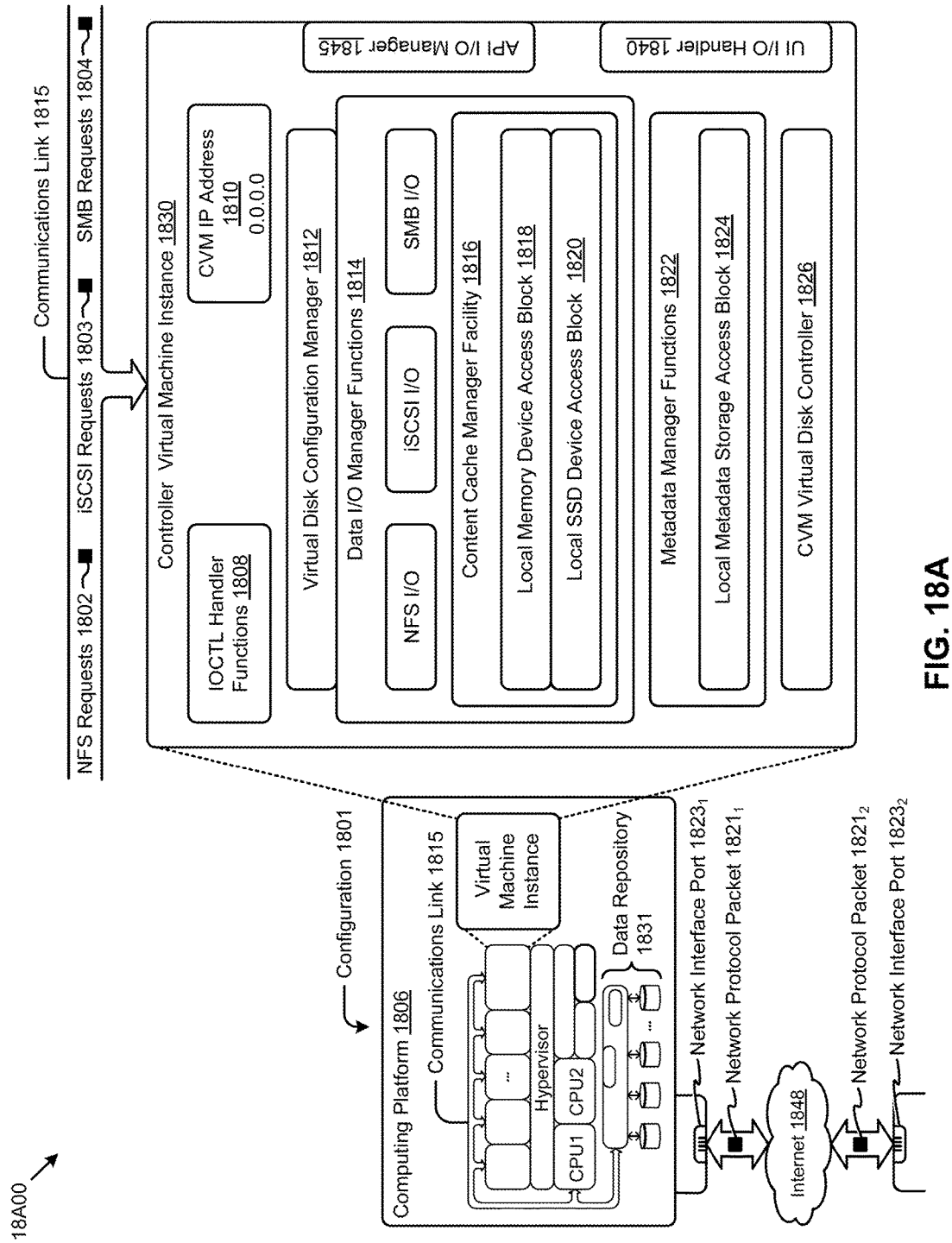
FIG. 18A and FIG. 18B depict virtualized controller architectures comprising collections of interconnected components suitable for implementing embodiments of the present disclosure and/or for use in the herein-described environments.

FIG. 18A depicts a virtualized controller as implemented by the shown virtual machine architecture 18A00. The virtual machine architecture comprises a collection of interconnected components suitable for implementing embodiments of the present disclosure and/or for use in the herein-described environments. Moreover, the shown virtual machine architecture 18A00 includes a virtual machine instance in a configuration 1801 that is further described as pertaining to the controller virtual machine instance 1830. A controller virtual machine instance receives block I/O (input/output or IO) storage requests as network file system (NFS) requests in the form of NFS requests 1802, and/or internet small computer storage interface (iSCSI) block IO requests in the form of iSCSI requests 1803, and/or Samba file system (SMB) requests in the form of SMB requests 1804. The controller virtual machine (CVM) instance publishes and responds to an internet protocol (IP) address (e.g., see CVM IP address 1810). Various forms of input and output (I/O or IO) can be handled by one or more IO control handler functions (e.g., IOCTL functions 1808) that interface to other functions such as data IO manager functions 1814 and/or metadata manager functions 1822. As shown, the data IO manager functions can include communication with a virtual disk configuration manager 1812 and/or can include direct or indirect communication with any of various block IO functions (e.g., NFS IO, iSCSI IO, SMB IO, etc.).

In addition to block IO functions, the configuration 1801 supports IO of any form (e.g., block IO, streaming IO, packet-based IO, HTTP traffic, etc.) through either or both of a user interface (UI) handler such as UI IO handler 1840 and/or through any of a range of application programming interfaces (APIs), possibly through the shown API IO manager 1845.

The communications link 1815 can be configured to transmit (e.g., send, receive, signal, etc.) any types of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives.

Volatile media includes dynamic memory such as a random access memory. As shown, the controller virtual machine instance 1830 includes a content cache manager facility 1816 that accesses storage locations, possibly including local dynamic random access memory (DRAM) (e.g., through the local memory device access block 1818) and/or possibly including accesses to local solid state storage (e.g., through local SSD device access block 1820).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 1831, which in turn can be formatted into any one or more storage areas, and which can comprise parameterized storage accessible by a key (e.g., a filename, a table name, a block address, an offset address, etc.). An external data repository 1831 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 1824. The external data repository 1831 can be configured using a CVM virtual disk controller 1826, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of a configuration 1801 can be coupled by a communications link 1815 (e.g., backplane, LAN, PTSN, wired or wireless network, etc.) and each instance may perform respective portions of sequences of instructions as may be required to practice embodiments of the disclosure.

The shown computing platform 1806 is interconnected to the Internet 1848 through one or more network interface ports (e.g., network interface port 1823₁ and network interface port 1823₂). The configuration 1801 can be addressed through one or more network interface ports using an IP address. Any operational element within computing platform 1806 can perform sending and receiving operations using any of a range of network protocols, possibly including network protocols that send and receive packets (e.g., see network protocol packet 1821₁ and network protocol packet 1821₂).

The computing platform 1806 may transmit and receive messages that can be composed of configuration data, and/or any other forms of data and/or instructions organized into a data structure (e.g., communications packets). In some cases, the data structure includes program code instructions (e.g., application code) communicated through Internet 1848 and/or through any one or more instances of communications link 1815. Received program code may be processed and/or executed by a CPU as it is received and/or program code may be stored in any volatile or non-volatile storage for later execution. Program code can be transmitted via an upload (e.g., an upload from an access device over the Internet 1848 to computing platform 1806). Further, program code and/or results of executing program code can be delivered to a particular user via a download (e.g., a download from the computing platform 1806 over the Internet 1848 to an access device).

The configuration 1801 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics of cluster-wide virtual machine health monitoring.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of cluster-wide virtual machine health monitoring). Such files or records can be brought into and/or stored in volatile or non-volatile memory.

Figure 18B:
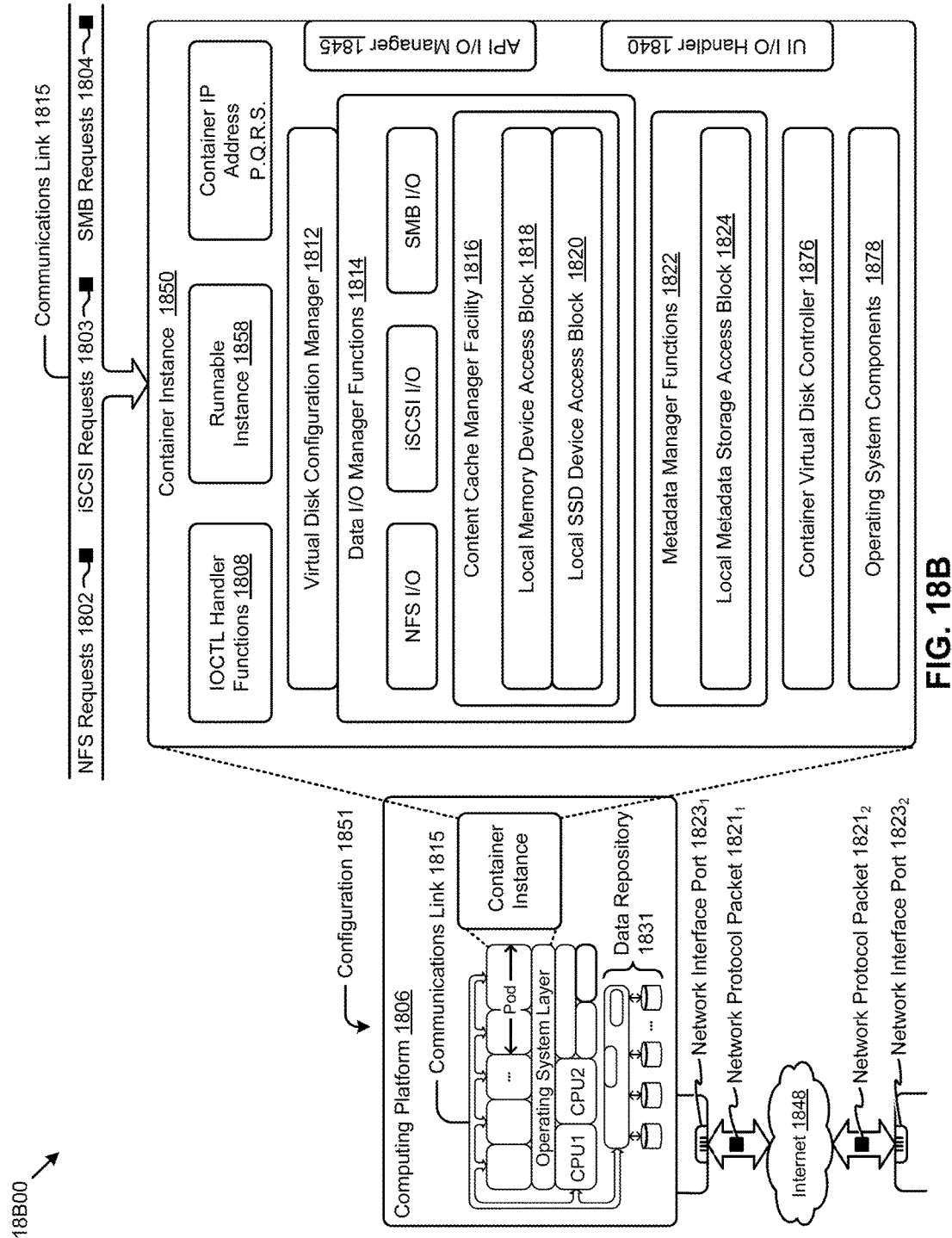

FIG. 18B depicts a virtualized controller implemented by a containerized architecture 18B00. The containerized architecture comprises a collection of interconnected components suitable for implementing embodiments of the present disclosure and/or for use in the herein-described environments. Moreover, the shown containerized architecture 18B00 includes a container instance in a configuration 1851 that is further described as pertaining to the container instance 1850. The configuration 1851 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., container instance 1850). A container instance can be executed by a processor. Runnable portions of a container instance sometimes derive from a container image, which in turn might include all, or portions of any of, a Java archive repository (JAR) and/or its contents, a script or scripts and/or a directory of scripts, and/or a virtual machine configuration, and may include any dependencies therefrom. In some cases a configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code and/or data initialization steps to perform than a respective virtual machine instance.

A container instance (e.g., a Docker container) can serve as an instance of an application container. Any container of any sort can be rooted in a directory system, and can be configured to be accessed by file system commands (e.g., "ls" or "ls -a", etc.). The container might optionally include operating system components 1878, however such a separate set of operating system components need not be provided. As an alternative, a container can include a runnable instance 1858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 1876. Such a container virtual disk controller can perform any of the functions that the aforementioned CVM virtual disk controller 1826 can perform, yet such a container virtual disk controller does not rely on a hypervisor or any particular operating system so as to perform its range of functions.

In some environments multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A computer-implemented method for managing a clustered virtualization environment, comprising:
   identifying a cluster of computing nodes that are interconnected by at least one communication path, wherein at least two of the computing nodes are further interconnected to a storage pool comprising at least one node-local storage device and at least one networked storage device;
   invoking, on a first node, a first health module comprising at least one first node data collection unit that accesses the storage pool;
   invoking, on a second node, a second health module comprising at least one second data collection unit that accesses the storage pool;
   storing, in the storage pool, a first set of collected data generated by the first health module, the first set of collected data tracking a health status for the first node or the cluster of computing nodes by receiving observations taken at the first node; and
   storing, in the storage pool, a second set of collected data generated by the second health module, the second set of collected data tracking a health status for the second node or the cluster of computing nodes by receiving observations taken at the second node.

2. The method of claim 1, further comprising performing an analysis, by the second node, of the first set of collected data to determine a health status of the first node.

3. The method of claim 1, further comprising detecting, by the second node, an interruption of service of the first node and invoking an instance of a new health module.

4. The method of claim 3, wherein the new health module accesses the storage pool and reads at least a portion of the first set of collected data gathered by the first health module.

5. The method of claim 1, further comprising issuing one or more alerts based on results of an analysis of at least a portion of the collected data.

6. The method of claim 1, further comprising logging an occurrence of an alert based at least in part on one or more observed events.

7. The method of claim 6, further comprising updating an alert database based at least in part on the one or more observed events.

8. The method of claim 6, further comprising initiating a corrective action based at least in part on the one or more observed events.

9. The method of claim 6, further comprising modifying a data collection schedule.

10. The method of claim 1, further comprising determining a version identifier of the first node health module and replacing the first node health module with a new instance of a health module having a newer version.

11. A computer readable medium, embodied in a non-transitory computer readable medium, the non-transitory computer readable medium having stored thereon a sequence of instructions which, when stored in memory and executed by a processor causes the processor to perform a set of acts for managing a clustered virtualization environment, the acts comprising:
   identifying a cluster of computing nodes that are interconnected by at least one communication path, wherein at least two of the computing nodes are further interconnected to a storage pool comprising at least one node-local storage device and at least one networked storage device;
   invoking, on a first node, a first health module comprising at least one first node data collection unit that accesses the storage pool;
   invoking, on a second node, a second health module comprising at least one second data collection unit that accesses the storage pool;
   storing, in the storage pool, a first set of collected data generated by the first health module, the first set of collected data tracking a health status for the first node or the cluster of computing nodes by receiving observations taken at the first node; and
   storing, in the storage pool, a second set of collected data generated by the second health module, the second set of collected data tracking a health status for the second node or the cluster of computing nodes by receiving observations taken at the second node.

12. The computer readable medium of claim 11, further comprising instructions which, when stored in memory and executed by the processor causes the processor to perform acts of performing an analysis, by the second node, of the first set of collected data to determine a health status of the first node.

13. The computer readable medium of claim 11, further comprising instructions which, when stored in memory and executed by the processor causes the processor to perform acts of detecting, by the second node, an interruption of service of the first node and invoking an instance of a new health module.

14. The computer readable medium of claim 13, wherein the new health module accesses the storage pool and reads at least a portion of the first set of collected data gathered by the first health module.

15. The computer readable medium of claim 11, further comprising instructions which, when stored in memory and executed by the processor causes the processor to perform acts of issuing one or more alerts based on results of an analysis of at least a portion of the collected data.

16. The computer readable medium of claim 11, further comprising instructions which, when stored in memory and executed by the processor causes the processor to perform acts of logging an occurrence of an alert based at least in part on one or more observed events.

17. The computer readable medium of claim 16, further comprising instructions which, when stored in memory and executed by the processor causes the processor to perform acts of updating an alert database based at least in part on the one or more observed events.

18. The computer readable medium of claim 11, further comprising instructions which, when stored in memory and executed by the processor causes the processor to perform acts of determining a version identifier of the first node health module and replacing the first node health module with a new instance of a health module having a newer version.

19. A system for managing a clustered virtualization environment comprising:
   a storage medium having stored thereon a sequence of instructions; and
   a processor or processors that execute the instructions to cause the processor or processors to perform a set of acts, the acts comprising,
      identifying a cluster of computing nodes that are interconnected by at least one communication path, wherein at least two of the computing nodes are further interconnected to a storage pool comprising at least one node-local storage device and at least one networked storage device;
      invoking, on a first node, a first health module comprising at least one first node data collection unit that accesses the storage pool;
      invoking, on a second node, a second health module comprising at least one second data collection unit that accesses the storage pool;
      storing, in the storage pool, a first set of collected data generated by the first health module, the first set of collected data tracking a health status for the first node or the cluster of computing nodes by receiving observations taken at the first node; and
      storing, in the storage pool, a second set of collected data generated by the second health module, the second set of collected data tracking a health status for the second node or the cluster of computing nodes by receiving observations taken at the second node.

20. The system of claim 19, wherein a new health module accesses the storage pool and reads at least a portion of the first set of collected data gathered by the first health module.

* * * * *